US008712036B2

(12) United States Patent
Smith et al.

(10) Patent No.: US 8,712,036 B2
(45) Date of Patent: *Apr. 29, 2014

(54) SYSTEM FOR ENCRYPTING AND DECRYPTING A PLAINTEXT MESSAGE WITH AUTHENTICATION

(76) Inventors: Eric Myron Smith, Dallas, TX (US);
Daniel Jason Williams, Plano, TX (US);
Troy Allan Schultz, Cambridge (CA);
Peter Schweitzer, Watertown, MA (US)

( * ) Notice: Subject to any disclaimer, the term of this patent is extended or adjusted under 35 U.S.C. 154(b) by 48 days.

This patent is subject to a terminal disclaimer.

(21) Appl. No.: 12/979,693

(22) Filed: Dec. 28, 2010

(65) Prior Publication Data

US 2012/0008767 A1    Jan. 12, 2012

Related U.S. Application Data

(63) Continuation of application No. 12/781,648, filed on May 17, 2010, now abandoned, which is a continuation-in-part of application No. 12/727,819, filed on Mar. 19, 2010, which is a continuation of application No. 11/496,214, filed on Jul. 31, 2006, now Pat. No. 7,715,553.

(60) Provisional application No. 60/595,720, filed on Sep. 13, 2005, provisional application No. 61/213,194, filed on May 15, 2009, provisional application No. 61/264,527, filed on Nov. 25, 2009.

(51) Int. Cl.
*H04K 1/00* (2006.01)
*H04K 1/04* (2006.01)
*H04L 9/00* (2006.01)
*H04L 9/32* (2006.01)

(52) U.S. Cl.
USPC ............... 380/28; 380/37; 380/263; 380/268; 380/277; 713/170

(58) Field of Classification Search
USPC ................ 713/150–154, 160–174, 182–186, 713/189–193, 202; 709/225, 229; 380/28–30, 255–283; 726/2–8
See application file for complete search history.

(56) References Cited

U.S. PATENT DOCUMENTS

| 6,226,742 B1 * | 5/2001 | Jakubowski et al. | 713/170 |
| 2003/0056118 A1 * | 3/2003 | Troyansky et al. | 713/201 |
| 2006/0056623 A1 * | 3/2006 | Gligor et al. | 380/28 |

* cited by examiner

*Primary Examiner* — Evans Desrosiers

(57) ABSTRACT

The described system and method provide for an encryption and authentication technique that achieves enhanced integrity verification through assured error-propagation using a multi-stage sequence of pseudorandom permutations. The method generates intermediate data-dependent cryptographic variables at each stage, which are systematically combined into feedback loops. The encryption technique also generates an authentication tag with minimal post processing that is the size of the state. The size of the state is dependent on the number of pseudorandom permutations and the size of the LFSR. The authentication tag provides a unique mapping to the plaintext for any number of plaintext blocks that is less than or equal the size of the state. In addition to being a stand alone encryption algorithm, the disclosed technique is applicable to any mode that uses pseudorandom permutations such as, key dependent lookup tables, S-Boxes, and block ciphers such as RC5, TEA, and AES.

22 Claims, 19 Drawing Sheets

US 8,712,036 B2

SYSTEM FOR ENCRYPTING AND DECRYPTING A PLAINTEXT MESSAGE WITH AUTHENTICATION

CROSS REFERENCE TO RELATED APPLICATIONS

This application is a continuation of application Ser. No. 12/781,648 filed May 17, 2010, which is a continuation-in-part of application Ser. No. 12/727,819, filed Mar. 19, 2010, which is a continuation of application Ser. No. 11/496,214, filed Jul. 31, 2006 (which is now U.S. Pat. No. 7,715,553 and which itself claims the benefit of U.S. Provisional Application No. 60/595,720, filed Sep. 13, 2005), and application Ser. No. 12/781,648 also claims the benefit of U.S. Provisional Application No. 61/213,194, filed May 15, 2009 and U.S. Provisional Application No. 61/264,527, filed Nov. 25, 2009, all of the above noted provisional and non-provisional applications incorporated by reference in their entirety herein.

FIELD OF THE INVENTION

The described embodiments relates generally to the technical field of data communication and storage. Specifically some embodiments relate to cryptographic methods and systems that allow for both the encryption and authentication of information through the use of a generic pseudorandom permutation.

BACKGROUND TO THE INVENTION

Data encryption methods provide privacy of the encrypted information over insecure communication channels. Encryption methods alone, however, lack manipulation detection abilities to ensure the integrity or authenticity of the information. Data authentication methods are required to detect when the received message was altered by an adversary during communication.

☐Many known algorithms provide authentication separate from the privacy. One of the most well known methods for providing data authentication generates an authentication tag or Message Authentication Code (MAC) through the use of a key dependent one-way hash function. A one-way hash function is designed such that it is comparatively easy to compute but almost impossible to reverse. Because the length of the authentication tag is usually fixed and shorter than the length of the initial message, the authentication tag cannot ensure a one-to-one mapping of messages to authentication tags. The length of the authentication tag, however, is designed to be long enough to thwart brute force attacks.

In the method for exchanging a message with an authentication tag, the sender initiates the exchange by generating an authentication tag from the authentic ☐message using a shared key. The sender then transfers the message and authentication tag to the receiver. At the receiving end, the receiver must generate an authentication tag from the received message using the shared key as well. The receiver then compares his or her generated authentication tag with the received authentication tag. If the two tags match, then the receiver can be assured that the message has not been modified during transmission and that it was sent by someone who knows the secret key.

The use of an authentication tag or MAC consumes time on the receiving end, because it requires the receiver to generate a MAC for comparison. When combined with a data encryption method, the receiver must decrypt the message and generate an authentication tag before the received information can be used. This conventional approach requires two passes over the same message on both the sending and receiving end often with the same basic algorithm. Furthermore, this conventional approach often requires the use of separate keys for each function. The use of two separate functions uses excessive processing power, memory, and time.

In applications focused on minimizing latency such as Supervisory Control and Data Acquisition (SCADA) networks, Remote Frequency Identification (RFID), and other real-time data exchange systems, received information must be used immediately making it impossible to use a separate MAC for data authentication. The devices used in such applications present further restrictions on processing power, code space, and memory. These applications highlight the need for methods that provide message integrity integrated with strong cryptographic privacy to minimize the latency and overhead imposed by separate conventional methods.

In response to the disadvantages of the conventional approaches, various methods have been suggested. Based on a new proof in error detection, the SCADA community including the AGA12 committee suggested assured error-propagation as a means for providing integrity without the need for a traditional MAC. Various methods exist that include error-propagation to provide some level of integrity. Depending on the level of error-propagation, a one-bit modification to the transmitted ciphertext results in some amount of randomization of subsequent bits in order to provide enhanced manipulation detection. One such method, Propagating Cipher Block Chaining (PCBC) was designed to fully propagate a one-bit modification to all subsequent bits. Since its ☐design, however, PCBC mode has been found to be vulnerable to some straight-forward attacks. For example, switching two ciphertext blocks leaves the rest of the message unchanged.

Andrew Wright et al. recently proposed another solution, AES PE-mode for use in SCADA networks that was designed based on the error detection proof to assure at least six bits of randomization following a one-bit manipulation (viz., A. K. Wright, J. A. Kinast, and J. McCarty. Low-Latency Cryptographic Protection for SCADA Communications. In: Proc. 2nd Int. Conf. on Applied Cryptography and Network Security, ACNS 2004). While PE-mode lacks the straight-forward vulnerabilities of PCBC, PE-mode imposes a great deal of latency and overhead, because it is essentially a cascade cipher of two AES encryption modes. In addition to encrypting the message twice, PE-mode is designed to be used with a separate message authentication algorithm such as a CBC-MAC. The drawbacks of PCBC and PE-mode illuminate the need for an error-propagating encryption algorithm that is both fast and small and does not require further steps to achieve integrity.

SUMMARY

The described embodiments provide methods and systems for efficiently integrating integrity and strong encryption through assured error-propagation and an automatically generated authentication tag. The provided embodiments are designed to work with considerably low levels of needed code space, processing resources, memory, and latency requirements. Briefly, the described embodiments consist of a multi-stage encryption system, wherein a plaintext block is passed through a sequence of pseudorandom permutations. The systems generate intermediate data-dependent cryptographic variables at each stage, which are systematically combined into feedback loops to produce assured error-propagation. At the conclusion of encryption, the embodiments generate a cryptographic hash using the final data-dependent cryptographic variables.

The described embodiments include methods, systems, processes, devices, stand-alone cryptographic algorithms, and modes of existing cryptographic algorithms. Several of these embodiments are described below.

In one embodiment, a method for multi-stage data encryption and authentication is defined wherein each stage is a pseudorandom permutation. The method comprises the steps of: receiving plaintext data, partitioning the plaintext into equal size plaintext blocks, passing the each plaintext block through a sequence of pseudorandom permutations, modifying the states of the pseudorandom permutations for the next block based on each current block's intermediate stage cryptographic variables each of which is the output of one stage in the sequence, and generating ciphertext from the output of each plaintext block's final stage. It should be noted that pseudorandom permutations are usually considered stateless. The described embodiments create what will be referred to as states by storing variables that are used to modify the input to each pseudorandom permutation. Since the state of these variables directly affects the output of each pseudorandom permutation, the permutations can be seen as having states.

In a further aspect of some embodiments, the implementation of each pseudorandom permutation can be achieved by one or multiple of the following: generating shifted permutation tables also known as S-Boxes, using existing cryptographic algorithms, including but not limited to AES, RC5, TEA, IDEA, Present, TWOFISH, or electronically implementing classical rotors.

In a further aspect of some embodiments, the modification of the states of each pseudorandom permutation is accomplished by following the pattern which will be referred to as the "312 rule". The pattern outlines the following steps:
  (a) The state of the first pseudorandom permutation is modified by the output of the next to the last pseudorandom permutation.
  (b) The states of the middle pseudorandom permutations are modified by the output of previous pseudorandom permutation.
  (c) The state of the last pseudorandom permutation is modified by both the state and output of the first pseudorandom permutation.

In a further aspect of some embodiments, the pattern may also include the following step:
  (d) The state of the second pseudorandom permutation is further modified by the state of the last pseudorandom permutation performed in step 'c'.

In a further aspect of some embodiments, the method may generate an authentication tag using the final plaintext block's state variables. The generation of the authentication tag is accomplished by either concatenating the final state variables or masking the final state variables by combining them with the initial permutation states before concatenation.

In a further aspect of some embodiments, the method may generate an authentication tag using plaintext block's state variables after they have been obfuscated. The first step in the generation of the authentication tag is to create distance by advancing the final state variables so that the final state variables may not be ascertained from the authentication tag. This is accomplished by encrypting the sum of two of the state variables until the desired distance has been achieved. The state variables at this point in time may then be used to compose the authentication tag.

In a further aspect of some embodiments, the method may include the step of initializing the beginning state variables. The initialization process is conducted by encrypting a nonce using a non-initialized version of the defined method and using the generated ciphertext and authentication tag as the beginning variables.

In a further aspect of some embodiments, the initialization process may be conducted by encrypting a nonce using a non-initialized version of the defined method and using the sum of two of the state variables at time t as the input. This is repeated for a number of iterations in order to resist crypt analysis. The result is a state that is unique and unpredictable as long as the nonce is unique.

In a further aspect of some embodiments, an internal counter may be used to further modify the states of the pseudorandom permutations. The addition of a counter, designed to eliminate short cycles, is performed by storing N counter variables where N is the number of pseudorandom permutation stages, incrementing the counter variables in an odometric fashion, and modifying each pseudorandom permutation state by the associated counter variable.

In a further aspect of some embodiments, a LFSR may be used in place of an internal counter. The size of the LFSR may be chosen arbitrarily. A portion of the LFSR may be used to modify one or more of the permutations.

In a further aspect of some embodiments, the number of needed pseudorandom permutations is reduced by substituting the inverse of pseudorandom permutations in use for some number of other pseudorandom permutations. For example, in a 4-stage method with pseudorandom permutations ABCD, the number of pseudorandom permutations required could be reduced by using the permutations $ABA^{-1}B^{-1}$ where $A^{-1}$ and $B^{-1}$ are the inverses of A and B respectively.

In a further aspect of some embodiments, the number of needed pseudorandom permutations may be reduced on one side of the communications channel by supplying only pseudorandom permutations on one side while the other side has both pseudorandom and inverse pseudorandom permutations. For example the server side can have both ABCD and $A^1B^1C^{-1}D^{-1}$ permutations while the client side can have only ABCD permutations. Communication from the server to the client may be accomplished by first decrypting the plaintext message (has the same effect as encrypting). The client can then recover the message by encrypting the ciphertext (has the same effect as decrypting). Communication from the client to the server may be performed in the normal fashion i.e. client encrypts message, server decrypts message.

In a further aspect of some embodiments, a data decryption method that is the inverse of the multi-stage data encryption and authentication method may be defined. The method comprises the steps of: receiving ciphertext data, partitioning the ☐ciphertext into equal size ciphertext blocks, passing each block through a sequence of pseudorandom permutations where each permutation is an inverse of the permutations used in the encryption method, modifying the states of the pseudorandom permutations for the next block based on each current block's intermediate stage cryptographic variables, and generating plaintext from the output of each ciphertext block's final stage. The decryption method passes each ciphertext block backwards through the sequence in the encryption method. It should be noted that the chosen embodiment of the decryption method should match those in the chosen embodiment of the encryption method. For example, if the chosen embodiment of the encryption method uses RC5 as the pseudorandom permutation, generates an authentication tag, and utilizes counters, the chosen embodiment of the decryption method should also use RC5, generate an authentication tag, and use counters.

In a further aspect of some embodiments, a method for performing an integrity check is defined. The method consists of the steps of: performing the encryption method defined in order to generate ciphertext and an authentication tag, performing the decryption method defined on said ciphertext in order to generate plaintext and a second authentication tag, and comparing the two authentication tags for equality. It can be assured with high probability that the ciphertext was not modified after encryption if the two authentication tags are equal.

In another embodiment, an encryption or decryption engine for encrypting or decrypting messages comprises memory for storing state variables and control logic that is configured to receive the message, apply one or more pseudorandom permutations to the blocks of the message, and modify the input to each pseudorandom permutations by at least one state variable which is modified by at least one of the previously generated permutation outputs, previously generated permutation outputs, ciphertext, and plaintext. The encryption/decryption engine may be further configured to generate or authenticate an authentication tag that is attached to the message. The control logic may be further configured to initialize the state variables and an LFSR by randomizing a nonce. The control logic may be further configured to modify at least one state variable by an LFSR.

DESCRIPTION OF VARIOUS EMBODIMENTS

For a more complete understanding of the described embodiments and for further features and advantages, reference is now made to the following description, taken in conjunction with the accompanying drawings, in which.

DETAILED DESCRIPTION

Figure 1:
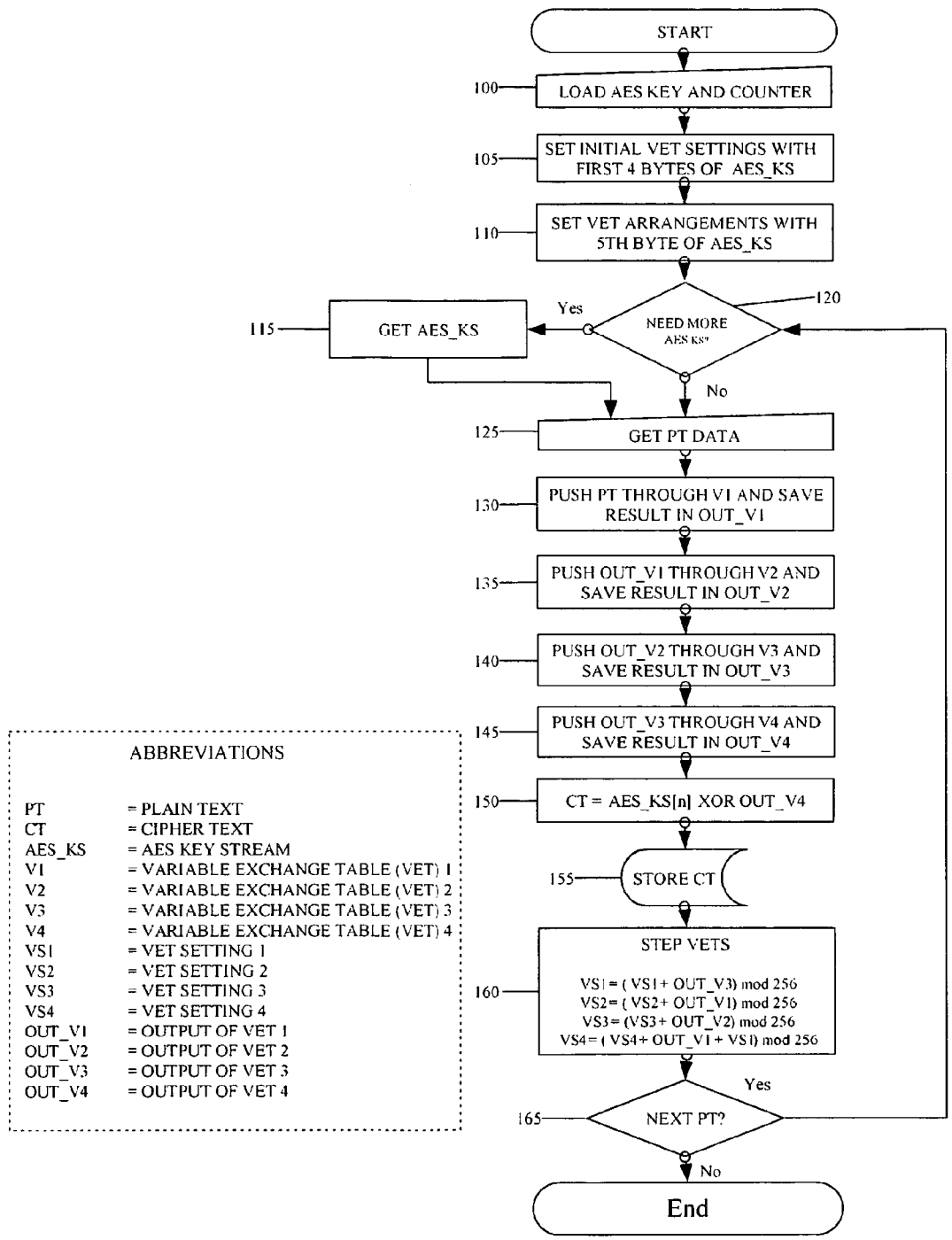
FIG. 1 is a first flowchart in accordance with an embodiment.
Figure 2:
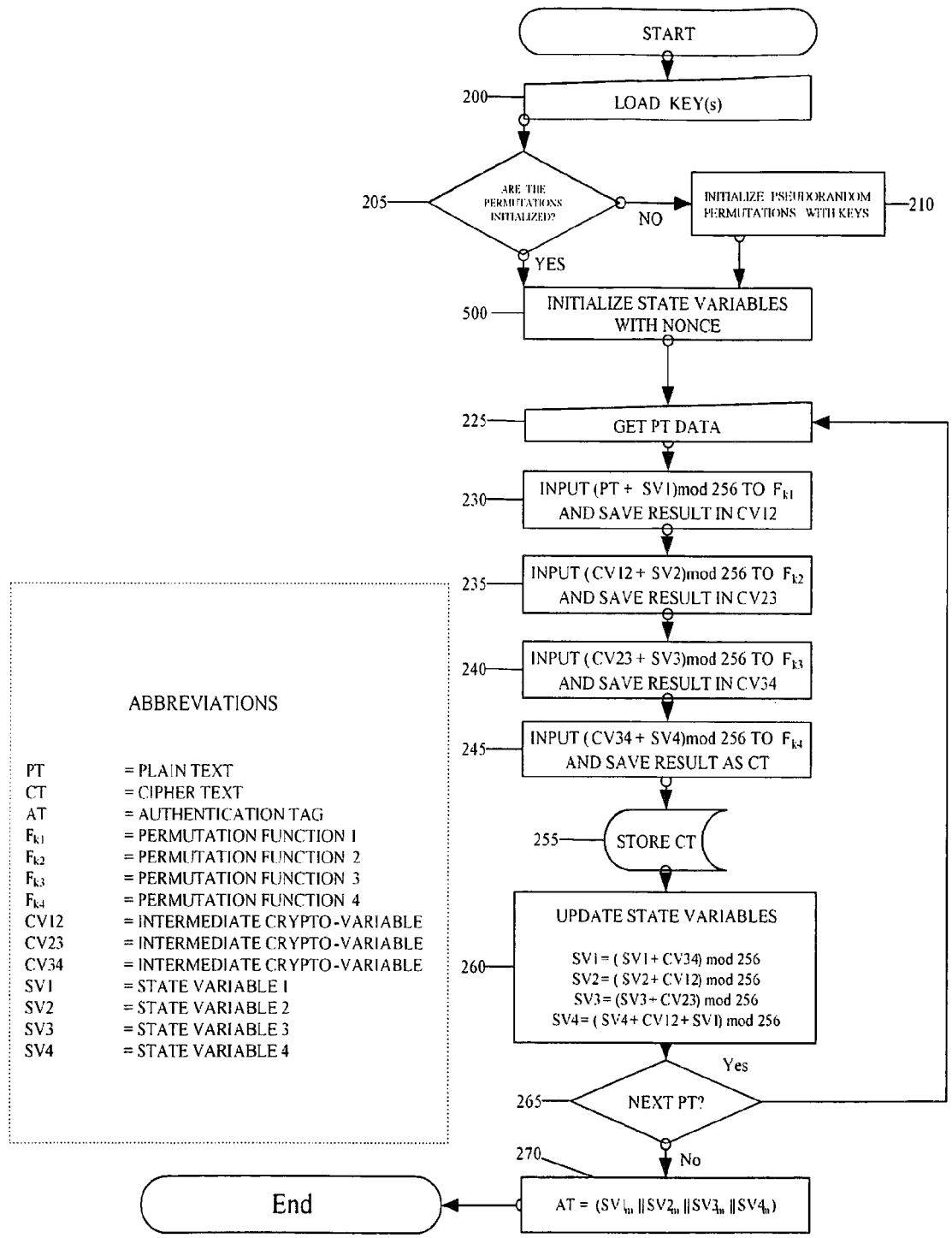
FIG. 2 is a second flowchart in accordance with an embodiment.

FIGS. 1 and 2 represent two versions of the flow chart explaining the steps of encryption for some of the embodiments described herein. FIG. 1 was the original diagram as can be found in the provisional patent. While maintaining the essential core of the invention, FIG. 2 is the revised encryption diagram with a more clear representation and the elimination of unneeded steps. Before explaining the details of the revised diagram, it is good to note the difference between the two diagrams.

The original diagram uses the term Variable Exchange Table (VET) which is now referred to as the more generally used and understood term, pseudorandom permutation. Furthermore, what was originally denoted as a VET Setting (VS) is now referred to as a state variable (SV), and the Output of a VET is now referred to as an intermediate cryptographic variable (CV). The terms have been modified for ease of understanding.

FIG. 1 contains all of the same steps as the revised diagram except the generation of the authentication tag 270 and the initialization of the state variables 500. At the time of submission of the provisional patent, the cryptographic strength was still undetermined. In order to compensate for the uncertainty, additional steps 115, 120, and 150 were added to the encryption method to facilitate the combination of the output of the final pseudorandom permutation with an AES keystream through an exclusive or (XOR) function to produce ciphertext. Said additional steps were thought to further protect the ciphertext from attacks. Further consideration and evaluation have eliminated the need for said additional steps, and therefore they have been removed from the revised diagram. Note that corresponding steps in the two diagrams have been numbered the same (ex 125 corresponds to 225).

FIG. 2 illustrates the steps involved in an encryption embodiment. From the start, a key and counter are loaded 200 in order to initialize the pseudorandom permutations if necessary 205 and 210. The next step initializes the state variables and counters with an nonce 500 which is described in further detail in FIG. 5. Once the plaintext is acquired 225, the first plaintext block is combined with the initialized state variables and stepped through a series of four pseudorandom permutations 230-245 resulting in the first ciphertext block 255. Before the next plaintext block can be encrypted, the state variables are updated using the intermediate cryptographic variables 260. This cycle continues 265 and 225 for all plaintext blocks. Optionally, the final state variables can be combined to form an authentication tag 270. The details of the embodied encryption method are described to a greater extent in the next diagram.

Figure 3:
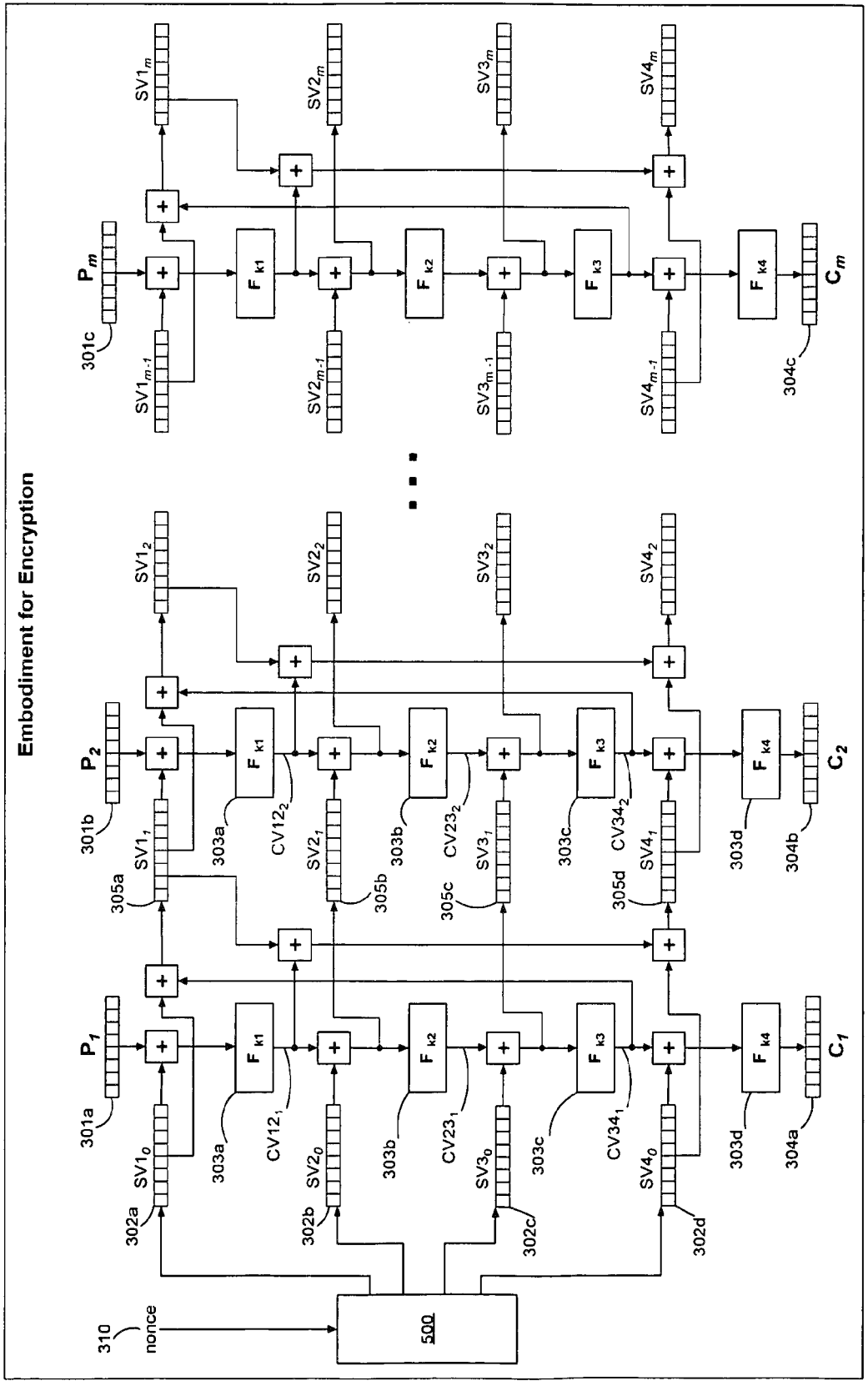
FIG. 3 illustrates an embodiment of an encryption system.

FIG. 3 represents an encryption embodiment wherein m plaintext blocks $P_i$ 301 are each passed through a sequence of four pseudorandom permutations 303 resulting in m ciphertext blocks 304. In this embodiment each of the four permutations 303 are keyed with different keys k1, k2, k3, and k4. The embodied method includes the step of initializing the state variables 302 by passing an nonce 310 through a randomization function 500 that is discussed in detail below. Once the state variables are initialized, the first plaintext block $P_i$ 301a is combined with the initial state variable $SV1_0$ 302a through modular $2^n$ addition where n is the size of a plaintext block. The result of said combination is passed into the first pseudorandom permutation $F_{k1}$ 303a producing an intermediate cryptographic variable, $CV12_{41}$ (the cryptographic variable between the first pseudorandom permutation $Fk_1$ 303a and the second $Fk_2$ 303b) which will be fed forward to encrypt the next plaintext block $P_2$ 301b. Continuing with the encryption of $P_1$ 301a, $CV12_1$ is combined with the second initialized state variable $SV2_0$ 302b through modular $2^n$ addition and passed into the second pseudorandom permutation $F_{k2}$ 303b resulting in $CV23_1$. The encryption continues to follow the same pattern for the two remaining pseudorandom permutations $Fk_3$ 303c and $F_{k4}$ 303d where the result of $F_{k4}$ 303d is the first ciphertext block $C_1$ 304a.

For the encryption of the next plaintext block $P_2$ 301b, the state variables 305 must be updated using a feedback mechanism as will be described. The first state variable $SV1_1$ 305a produced following the encryption of the first plaintext block $P_1$, 301a is generated by combining the previous state variable $SV1_0$ 302a with the output from the previous block's third permutation $CV34_1$ through modular $2^n$ addition where n is the size of a plaintext block. The second state variable $SV2_1$ 305b is generated by combining the previous state variable $SV2_0$ 302b with the output from the previous block's first permutation $CV12_1$ through modular $2^n$ addition. Similarly, the third state variable $SV3_1$ 305c is generated by combining the previous state variable $SV3_0$ 302c with the output from the previous block's second permutation $CV23_1$ through modular $2^n$ addition. The fourth state variable $SV4_1$ 305d is generated by combining the previous state variable $SV4_0$ 302d with the output from the previous block's first permutation $CV12_1$ and the current block's first state variable $SV1_1$ 305a, through modular $2^n$ addition. It should be noted that the calculation of $SV1_1$ 305a should occur before the calculation of $SV4_1$ 305d. Furthermore, while the described embodiment stores the state variables SV1, SV2, SV3, and SV4, derived embodiments could entail the same spirit of the present embodiments without actually storing the state variables. The step of storing state variables is disclosed for ease of understanding.

The encryption of all further plaintext blocks $P_2$ 301b through $P_m$ 301c are conducted in the same manner as the encryption of $P_1$ 301a. For example, the second □plaintext block $P_2$ 301b is conducted in the same manner as the encryption of the first plaintext block $P_1$ 301a substituting the updated state variables 305 for the previous state variables 302.

Figure 4:
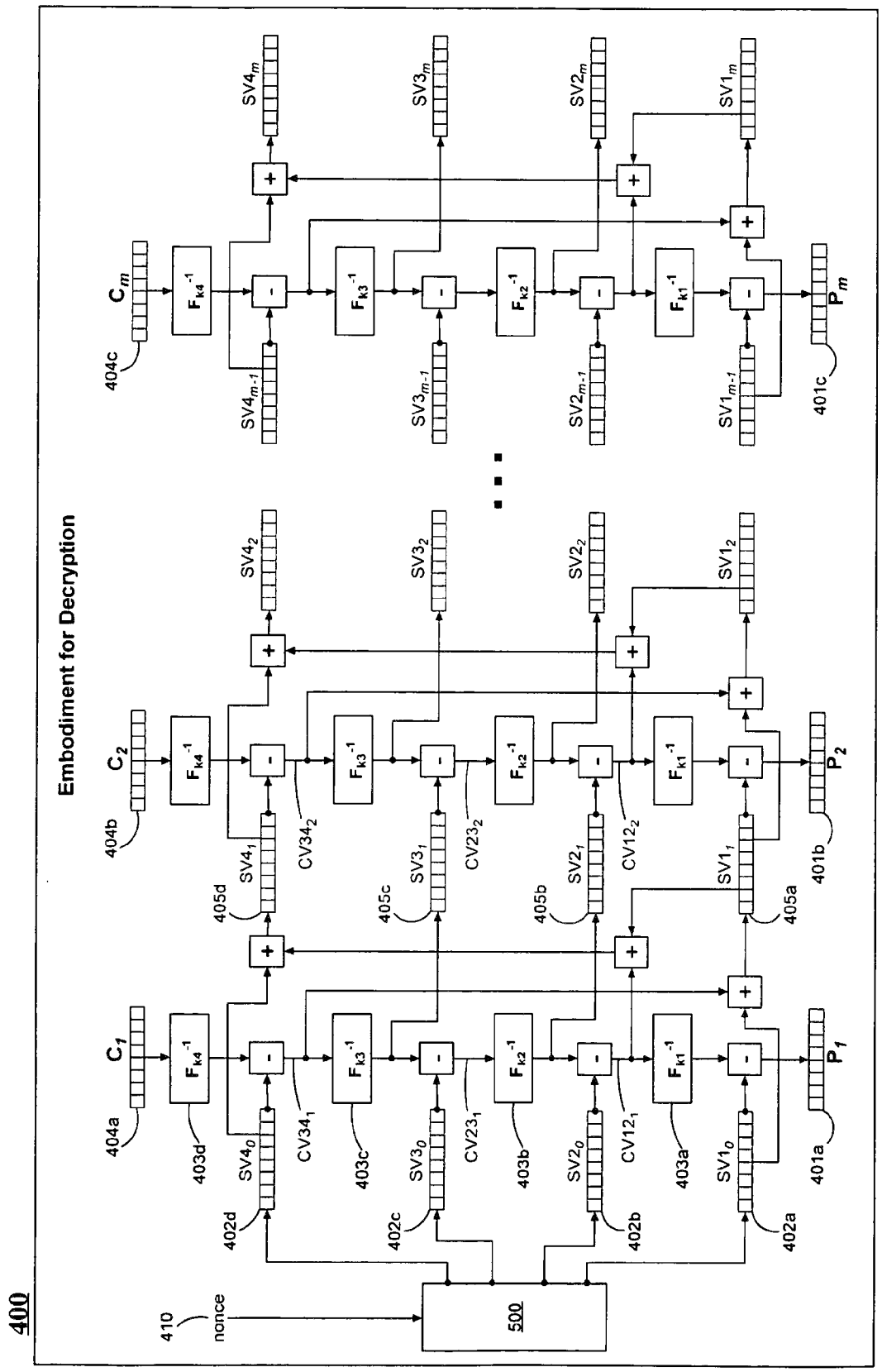
FIG. 4 illustrates an embodiment of a decryption.

FIG. 4 represents a decryption embodiment wherein m ciphertext blocks $C_i$ 404 are each passed through a sequence of four inverse pseudorandom permutations $FK^{-1}$ 403 resulting in m plaintext blocks $P_i$ 401. In this embodiment each of the four inverse permutations $FK^{-1}$ 403 are keyed with the same keys used in the encryption in FIG. 3. The embodied method includes the step of initializing the state variables 402 by passing an nonce 410 through a randomization function 500 that is discussed in detail below. Once the state variables 402 are initialized, the first ciphertext block $C_1$ 404a is passed into the first inverse pseudorandom permutation $F_{k4}^{-1}$ 403d. The result of said inverse pseudorandom permutation $F_{k4}^{-1}$ 403d is combined with the initial state variable $SV4_0$ 402d through modular $2^n$ subtraction where n is the size of a ciphertext block producing an intermediate cryptographic variable $CV34_1$ (the cryptographic variable between $F_{k3}^{-1}$ 403c and $F_{k4}^{-1}$ 403d) which will be fed forward to decrypt the next ciphertext block $C_2$ 404b. Continuing with the decryption of $C_1$ 404a, $CV34_1$ is passed into the second inverse psuedorandom permutation $F_{k3}^{-1}$ 403ca. The result of said inverse permutation $F_{k3}^{-1}$ 403c is combined with $SV3_0$ using modular $2^n$ subtraction producing $CV23_1$. The decryption continues to follow the same pattern for the two remaining inverse pseudorandom permutations $F_{k2}^{-1}$ 403b and $F_{k1}^{-1}$ 403a where the result of $F_{k1}^{-1}$ 403a is combined with $SV1_0$ 402a using modular $2^n$ subtraction to produce the first plaintext block $P_1$ 401a.

For the decryption of the next ciphertext block $C_2$ 404b, the state variables 405 must be updated using a feedback mechanism as will be described. The state variable $SV_1$, 405a, produced following the decryption of the first ciphertext block $C_1$ 404a, is generated by combining the previous state variable $SV1_0$ 402a with the input from the previous block's second inverse permutation $CV34_1$ through modular $2^n$ addition where n is the size of a ciphertext block. The second state variable $SV2_1$ 405b is the output of the previous block's third inverse permutation $F_{k1}^{-1}$ 403b. Similarly, the state variable $SV3_1$ 405c is the output of the previous block's second inverse permutation $F_{k3}^{-1}$ 403c. The state variable $SV4_1$ 405d is generated by combining the previous state variable $SV4_0$ 402d with the input from the previous block's fourth inverse permutation $CV12_1$ and the current block's state variable $SV1_1$, 405a, through modular $2^n$ addition. It should be noted that the calculation of $SV_1$, 405a should occur before the calculation of $SV4_1$ 405d. Furthermore, while the described embodiment stores the state variables SV1, SV2, SV3, and SV4, derived embodiments could entail the same spirit of the present embodiments without actually storing the state variables. The step of storing state variables is disclosed for ease of understanding.

The decryption of all further ciphertext blocks $C_2$ 404b through $C_m$ 404c are conducted in the same manner as the decryption of $C_1$ 404a. For example, the second ciphertext block $C_2$ 404b is conducted in the same manner as the decryption of the first ciphertext block $C_1$ 404a substituting the updated state variables 405 for the previous state variables 402.

Figure 5:
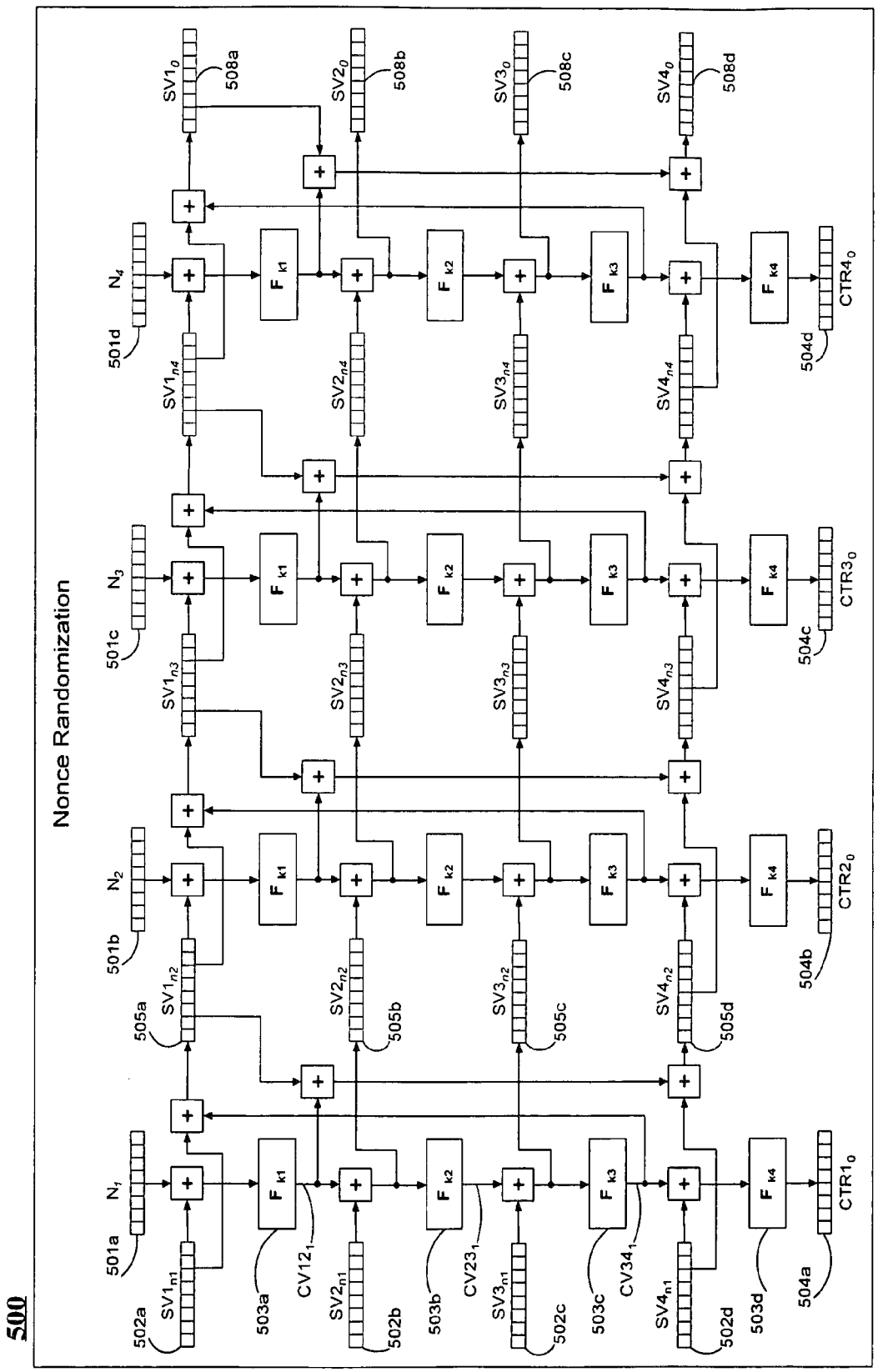
FIG. 5 illustrates an embodiment for initializing variables using a nonce.

FIG. 5 illustrates the function of generating initial values by randomizing a nonce as used in FIGS. 3, 4, 9, and 10. The purpose said function is to initialize the state variables and counters to unique and unpredictable values. The nonce or input to the function may be a random number, an incrementing counter, or any value as long as it has not been used before in the context of a given key(s). It should be noted that the nonce need not be secret. The initialization function parses a unique value into m blocks $N_i$ 501 and passes each block through a sequence of m pseudorandom permutations 503 resulting in values that are used in the initial setup of both the encryption and decryption methods. Padding may be necessary in order to facilitate equal sized blocks. The number of blocks m and the number of pseudorandom permutations m must always be the same. In the present embodiment of the initialization function, m is equal to 4. The randomization function keys each of the four permutations $F_K$ 503 with different keys k1, k2, k3, and k4. The embodied method includes the step of initializing the state variables 502 to a constant such as zero. Once the state variables 502 are initialized, the first block $N_1$ 501a is combined with the initial state variable $SV1_{n1}$ 502a through modular $2^n$ addition where n is the size of a block. The result of said combination is passed into the first pseudorandom permutation $F_{k1}$ 503a producing an intermediate cryptographic variable $CV12_1$ (the cryptographic variable between the first pseudorandom permutation $F_{k1}$ 503a and the second $F_{k2}$ 503b) which will be fed forward to encrypt the next block $N_2$ □501b. Continuing with the randomization function of $N_1$ 501a, $CV12_1$ is combined with the second initialized state variable $SV2_{n1}$ 502b through modular $2^n$ addition and passed into the second pseudorandom permutation $F_{k2}$ 503b resulting in $CV23_1$. The randomization continues to follow the same pattern for the two remaining pseudorandom permutations $F_{k3}$ 503c and $F_{k4}$ 503d where the result of $F_{k4}$ 503d is the first CTR value $CTR1_0$ 504a. It should be noted that some embodiments may not use the generated CTR 504 values.

For the next block $N_2$ 501b, the state variables 505 must be updated using a feedback mechanism as will be described. The first state variable $SV1_{n2}$ 505a produced following the randomization of the first block $N_1$ 501a is generated by combining the previous state variable $SV1_{n1}$ 502a with the output from the previous block's third permutation $CV34_1$ through modular $2^n$ addition where n is the size of a block. The second state variable $SV2_{n2}$ 505b is generated by combining the previous state variable $SV2_{n1}$ 502b with the output from the previous block's first permutation $CV12_1$ through modular $2^n$ addition. Similarly, the third state variable $SV3_{n2}$ 505c is generated by combining the previous state variable $SV3_{n1}$ 502c with the output from the previous block's second permutation $CV23_1$ through modular $2^n$ addition. The fourth state variable $SV4_{n2}$ 505d is generated by combining the previous state variable $SV4_{n1}$ 502d with the output from the previous block's first permutation $CV12_1$ and the current block's first state variable $SV1_{n2}$ 505a, through modular $2^n$ addition. It should be noted that the calculation of $SV1_{n2}$ 505a should occur before the calculation of $SV4_{n2}$ 505d. Furthermore, while the described embodiment stores the state variables SV1, SV2, SV3, and SV4, derived embodiments could entail the same spirit of the present embodiments without actually storing the state variables. The step of storing state variables is disclosed for ease of understanding.

The randomization of all further plaintext blocks $N_2$ 501b through $N_4$ 501d are conducted in the same manner as the randomization of $N_1$ 501a. For example, the second plaintext block $N_2$ 501b is conducted in the same manner as the randomization of the first plaintext block $N_1$ 501a substituting the updated state variables 505 for the previous state variables 502. After the four blocks 501 are each randomized, the resulting state variables $SV1_0$, $SV2_0$, $SV3_0$, and $SV4_0$ 508 can be used as initial state variables for □FIG. 3, 4, 9,10. Similarly, the resulting randomized values, $CTR1_0$, $CTR2_0$, $CTR3_0$, and $CTR4_0$ 504 can be used as initial counters for FIG. 9,10.

Figure 6:
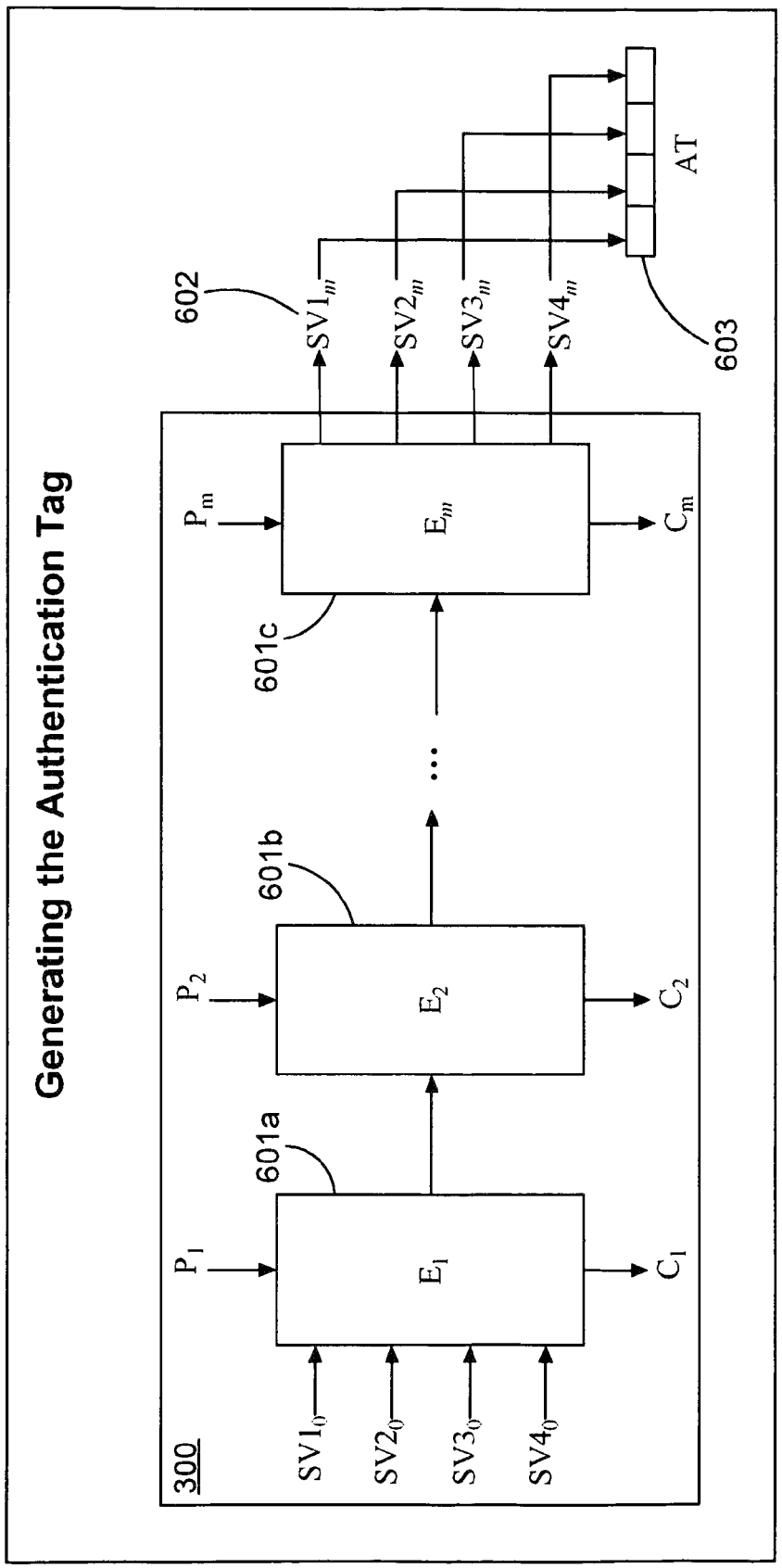
FIG. 6 illustrates an embodiment for generating an authentication tag from final state variables.

FIG. 6 presents an elevated look at the method for generating an authentication tag from the results of the previously described encryption embodiment. The diagram includes an abbreviated version of the encryption method 300 in which each sequence of pseudorandom permutations is depicted in a single encryption function $E_i$ 601. The final encryption function $E_m$ 601c produces four final state variables 602 which are concatenated to form an authentication tag 603. As explained previously, an authentication tag is used to provide an integrity check on encrypted data.

Figure 7:
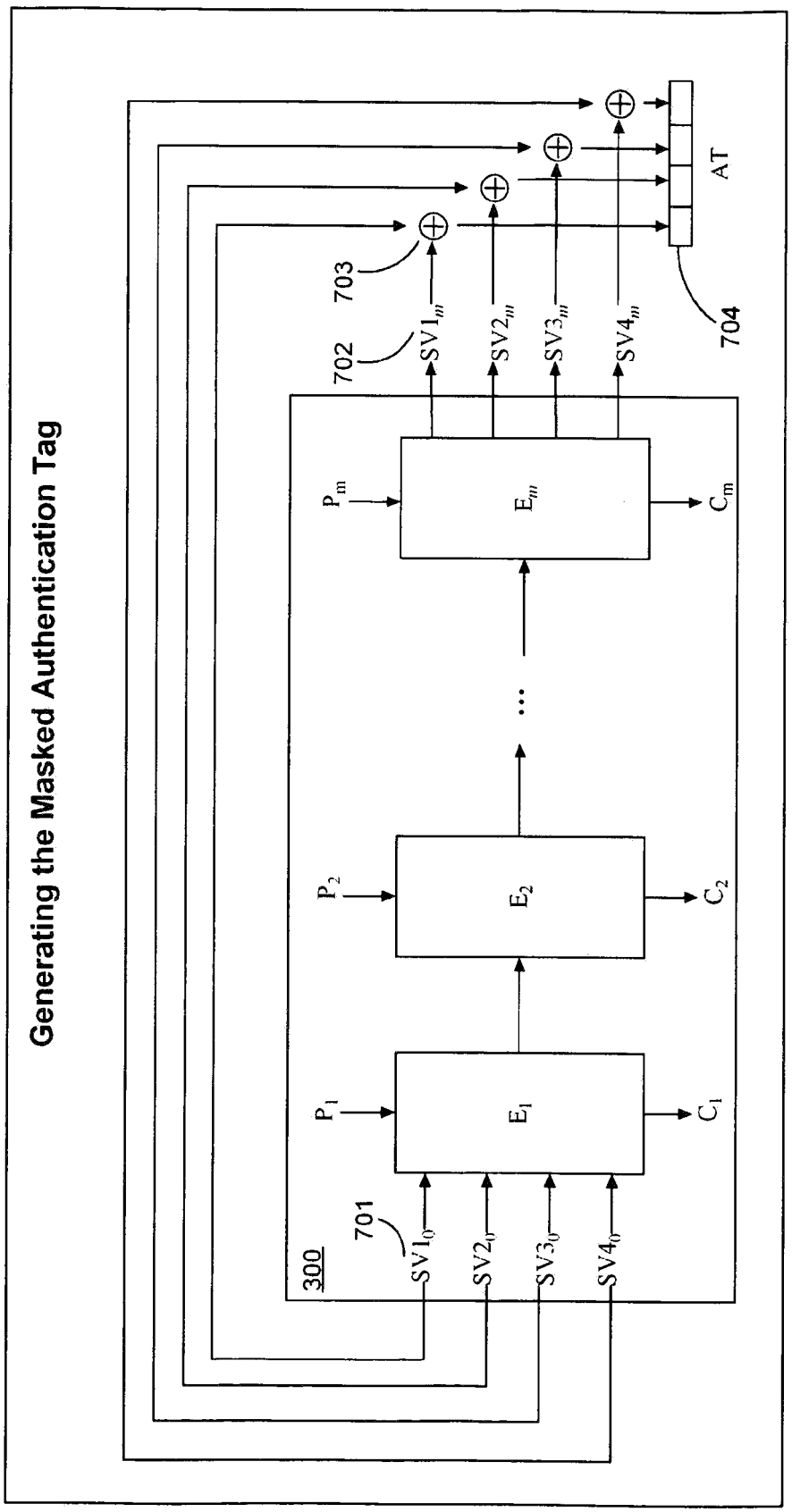
FIG. 7 illustrates an embodiment for generating a masked authentication tag from a combination of the initial and final state variables.

FIG. 7 represents an alternative embodiment of the method for generating an authentication tag from the results of the encryption embodiment. As in FIG. 6, the diagram includes an abbreviated version of the encryption method 300. In this alternative embodiment, each final state variable 702 is combined with its corresponding initial state variable 701 through an XOR function 703 before being concatenated to form the authentication tag 704. This alternative embodiment masks the final state variables from being openly accessible to an attacker and may serve to increase the cryptographic strength.

Figure 8:
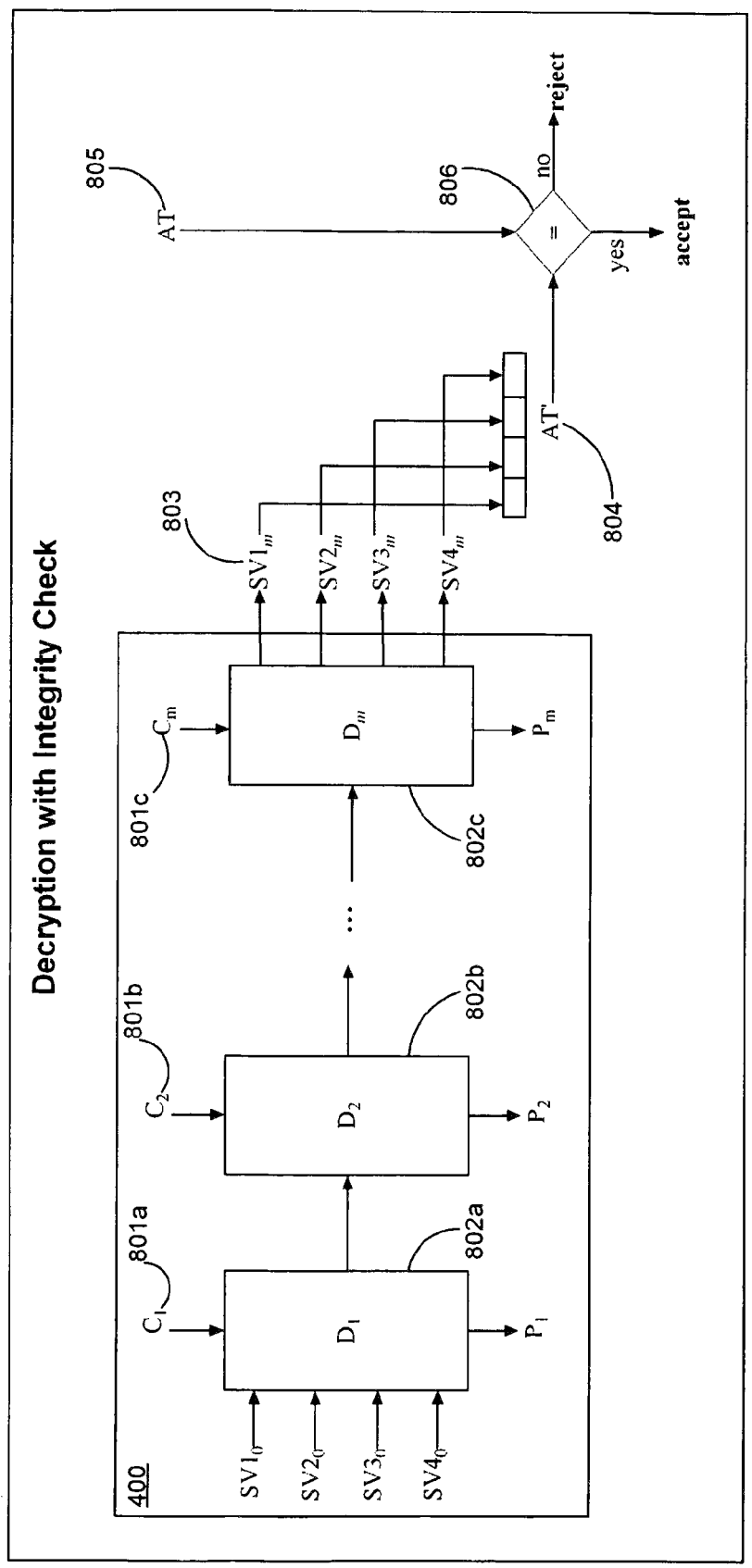
FIG. 8 illustrates an embodiment for decrypting and verifying the integrity of the message using a received authentication tag.

FIG. 8 represents an embodied method for performing an integrity check of a message after decryption. The diagram includes an abbreviated version of the decryption method 400 in which each sequence of inverse pseudorandom permutations is depicted in a single decryption function $D_i$ 802. The received message includes a previously generated authentication tag AT 805 in addition to the ciphertext 801. Said authentication tag was previously generated during encryption as is depicted in FIG. 6. The final decryption function $D_m$ 802c produces four final state variables 803 which are concatenated to form an authentication tag AT' 804. The received authentication tag AT 805 identifies the original message that was encrypted, while the newly generated authentication tag AT' 804 identifies the received message. With the two authentication tags, an integrity check 806 is performed as follows. If the two authentication tags are not equal, the message was modified between its encryption and decryption and should be rejected. Conversely, if the authentication tags are equal, it can be assured with high probability that the message has not been tampered with and can be accepted. It should □be noted that an integrity check could also be performed using a previously generated authentication tag as in FIG. 7. The method for generating an authentication tag during decryption would match the encryption method in FIG. 7 followed by an integrity check as in the present figure.

Figure 9:
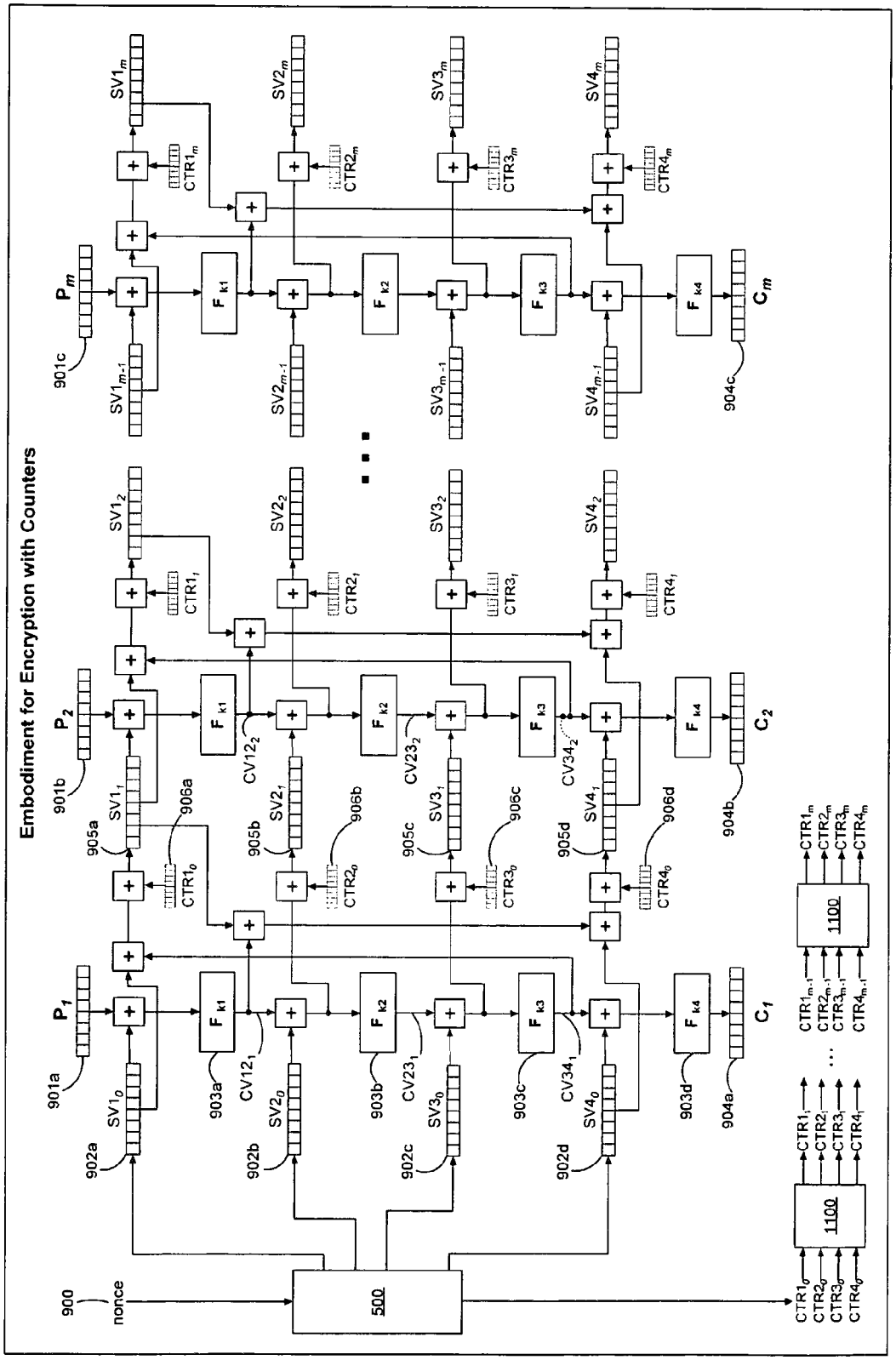
FIG. 9 illustrates an embodiment of the encryption method from FIG. 3 with the addition of counters.

FIG. 9 represents a further aspect wherein counters are added. In the same manner as the embodiment in FIG. 3, m plaintext blocks $P_i$ 901 are each passed through a sequence of four pseudorandom permutations $F_k$ 903 resulting in m ciphertext blocks $C_i$ 904. Each of the four permutations $F_k$ 903 are keyed with different keys k1, k2, k3, and k4. The embodied method includes the step of initializing the state variables 902 and counters 906 by passing a nonce 900 through a randomization function 500 that has been previously defined. Once the state variables and counters are initialized, the first plaintext block $P_1$ 301a is combined with the initial state variable $SV1_0$ 902a through modular $2^n$ addition where n is the size of a plaintext block. The result of said combination is passed into the first pseudorandom permutation $F_{k1}$ 903a producing an intermediate cryptographic variable $CV12_1$ (the cryptographic variable between the first pseudorandom permutation $F_{k1}$ 903a and the second $F_{k2}$ 903b) which will be fed forward to encrypt the next plaintext block $P_2$ 901b. Continuing with the encryption of $P_1$ 901a, $CV12_1$ is combined with the second initialized state variable $SV2_0$ 902b through modular $2^n$ addition and passed into the second pseudorandom permutation $F_{k2}$ 903b resulting in $CV23_1$. The encryption continues to follow the same pattern for the two remaining pseudorandom permutations $F_{k3}$ 903c and $F_{k4}$ 903d where the result of $F_{k4}$ 903d is the first ciphertext block $C_1$ 904a.

For the encryption of the next plaintext block $P_2$ 901b, the state variables 905 must be updated using counters and a feedback mechanism as will be described. The first state variable $SV1_1$ 905a produced following the encryption of the first plaintext block $P_1$ 901a is generated by combining the previous state variable $SV1_0$ 902a with the output from the previous block's third permutation $CV34_1$ and a counter $CTR1_0$ 906a through modular $2^n$ addition where n is the size of a plaintext block. The second state variable $SV2_1$ 905b is generated by combining the previous state variable $SV2_0$ 902b with the output from the previous block's first permutation $CV12_1$ and a counter $CTR2_0$ 906b through modular $2^n$ addition. Similarly, the third state variable $SV3_1$ 905c is generated by combining the previous state variable $SV3_0$ 902c with the output from the previous block's second permutation $CV23_1$ and a counter $CTR3_0$ 906c through modular $2^n$ addition. The fourth state variable $SV4_1$ 905d is generated by combining the previous state variable $SV4_0$ 902d with the output from the previous block's first permutation $CV12_1$ and the current block's first state variable $SV1_1$ 905a and a counter $CTR4_0$ 906d through modular $2^n$ addition. The counters 906 are then incremented using function 1100. It should be noted that the calculation of $SV1_1$ 905a should occur before the calculation of $SV4_1$ 905d. Furthermore, while the described embodiment stores the state variables SV1, SV2, SV3, and SV4, derived embodiments could entail the same spirit of the present embodiments without actually storing the state variables. The step of storing state variables is disclosed for ease of understanding.

The encryption of all further plaintext blocks $P_2$ 901b through $P_m$ 901c are conducted in the same manner as the encryption of $P_1$ 901a. For example, the second plaintext block $P_2$ 901b is conducted in the same manner as the encryption of the first plaintext block $P_1$ 901a substituting the updated state variables 905 for the previous state variables 902.

Figure 10:
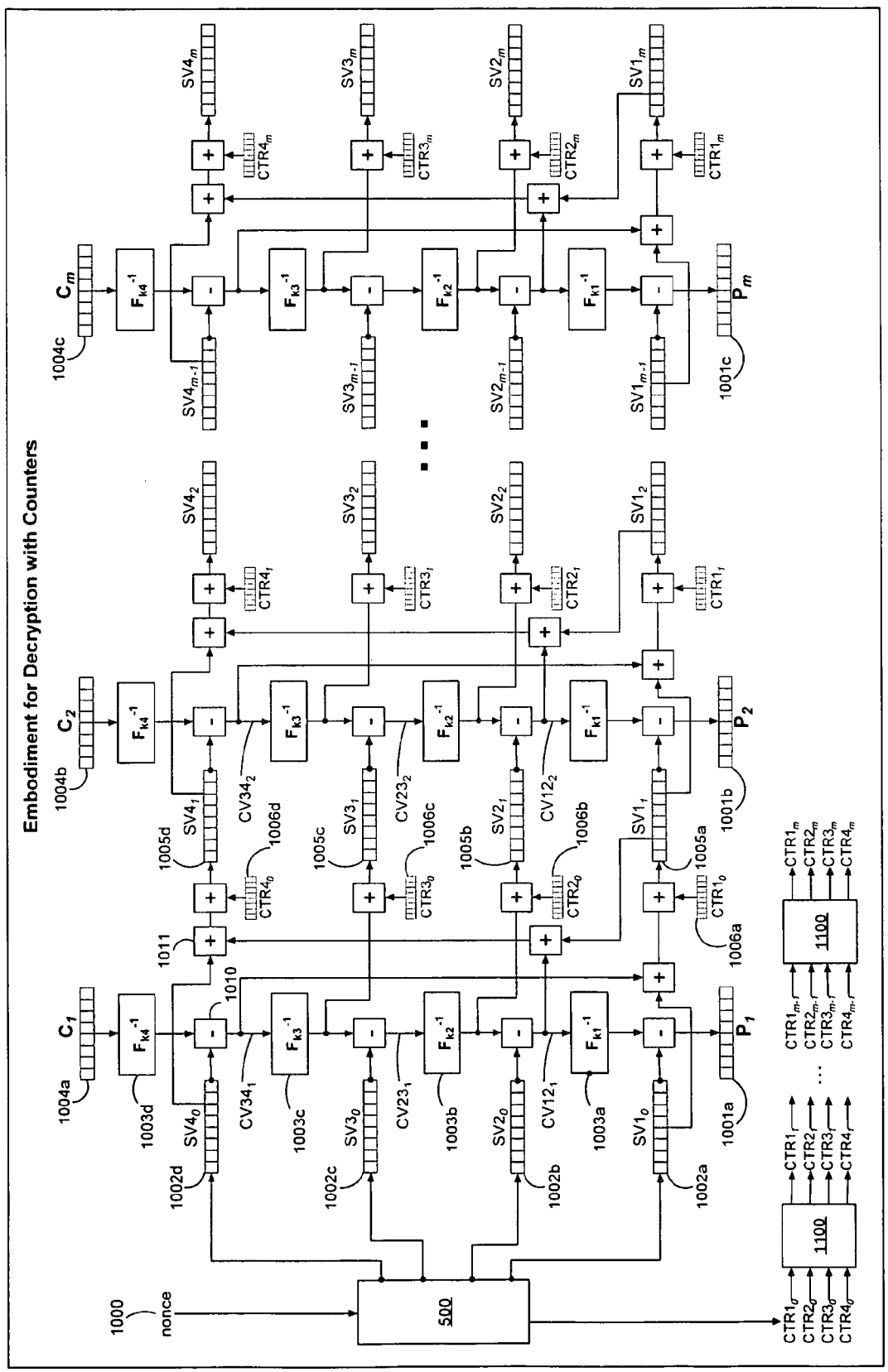
FIG. 10 illustrates an embodiment of the decryption method from FIG. 4 with the addition of counters.

FIG. 10 represents a decryption embodiment wherein m ciphertext blocks $C_i$ 1004 are each passed through a sequence of four inverse pseudorandom permutations 1003 resulting in m plaintext blocks $P_i$ 1001. In this embodiment each of the four inverse permutations 1003 are keyed with the same keys used in the encryption in FIG. 9. The embodied method includes the step of initializing the state variables 1002 and initial counters 1006 by passing a nonce 1000 through a randomization function 500 that has been previously defined. Once the state variables and counters are initialized, the first ciphertext block $C_1$ 1004a is passed into the first inverse pseudorandom permutation $F_{k4}^{-1}$ 1003d. The result of said inverse pseudorandom permutation $F_{k4}^{-1}$ 1003d is combined with the initial state variable $SV4_0$ 1002d through modular $2^n$ subtraction where n is the size of a ciphertext block producing an intermediate cryptographic variable $CV34_1$ (the cryptographic variable between $F_{k3}^{-1}$ 1003c and $F_{k4}^{-1}$ 1003d) which will be fed forward to decrypt the next ciphertext block $C_2$ 1004b. Continuing with the decryption of $C_1$ 1004a, $CV34_1$ is passed into the second inverse □psuedorandorandom permutation $F_{k3}^{-1}$ 1003c. The result of said inverse permutation $F_{k3}^{-1}$ 1003c is combined with $SV3_0$ using modular $2^n$ subtraction producing $CV23_1$. The decryption continues to follow the same pattern for the two remaining inverse pseudorandom permutations $F_{k2}^{-1}$ 1003b and $F_{k1}^{-1}$ 1003a where the result of $F_{k3}^{-1}$ 1003a is combined with $SV1_0$ 1002a using modular $2^n$ subtraction to produce the first plaintext block $P_1$ 1001a.

For the decryption of the next ciphertext block $C_2$ 1004b, the state variables 1005 must be updated using a feedback mechanism as will be described. The state variable $SV1_1$ 1005a produced following the decryption of the first ciphertext block $C_1$ 1004a is generated by combining the previous state variable $SV1_0$ 1002a with the input from the previous block's second inverse permutation $CV34_1$ and a counter $CTR1_0$ 1006a through modular $2^n$ addition where n is, the size of a ciphertext block. The second state variable $SV2_1$ 1005b is the output from the previous block's third inverse permutation $F_{k2}^{-1}$ 1003b and a counter $CTR2_0$ 1006b through modular $2^n$ addition. Similarly, the state variable $SV3_1$ 1005c is the output from the previous block's second pseudorandom permutation $F_{k3}^{-1}$ 1003c and a counter $CTR3_0$ 1006c through modular $2^n$ addition. The state variable $SV4_1$ 1005d is generated by combining the previous state variable $SV4_0$ 1002d with the input from the previous blocks fourth inverse permutation $CV12_1$ and the current block's state variable $SV1_1$ 1005a and a counter $CTR4_0$ 1006a through modular $2^n$ addition. The counters 1006 are then incremented using function 1100. It should be noted that the calculation of $SV1_1$ 1005a should occur before the calculation of $SV4_1$ 1005d. Furthermore, while the described embodiment stores the state variables SV1, SV2, SV3, and SV4, derived embodiments could entail the same spirit of the present embodiments without actually storing the state variables. The step of storing state variables is disclosed for ease of understanding.

The decryption of all further ciphertext blocks $C_2$ 1004b through $C_m$ 1004c are conducted in the same manner as the decryption of $C_1$ 1004a. For example, the second ciphertext block $C_2$ 1004b is conducted in the same manner as the decryption of the first ciphertext block $C_1$ 1004a substituting the updated state variables 1005 for the previous state variables 1002.

Figure 11:
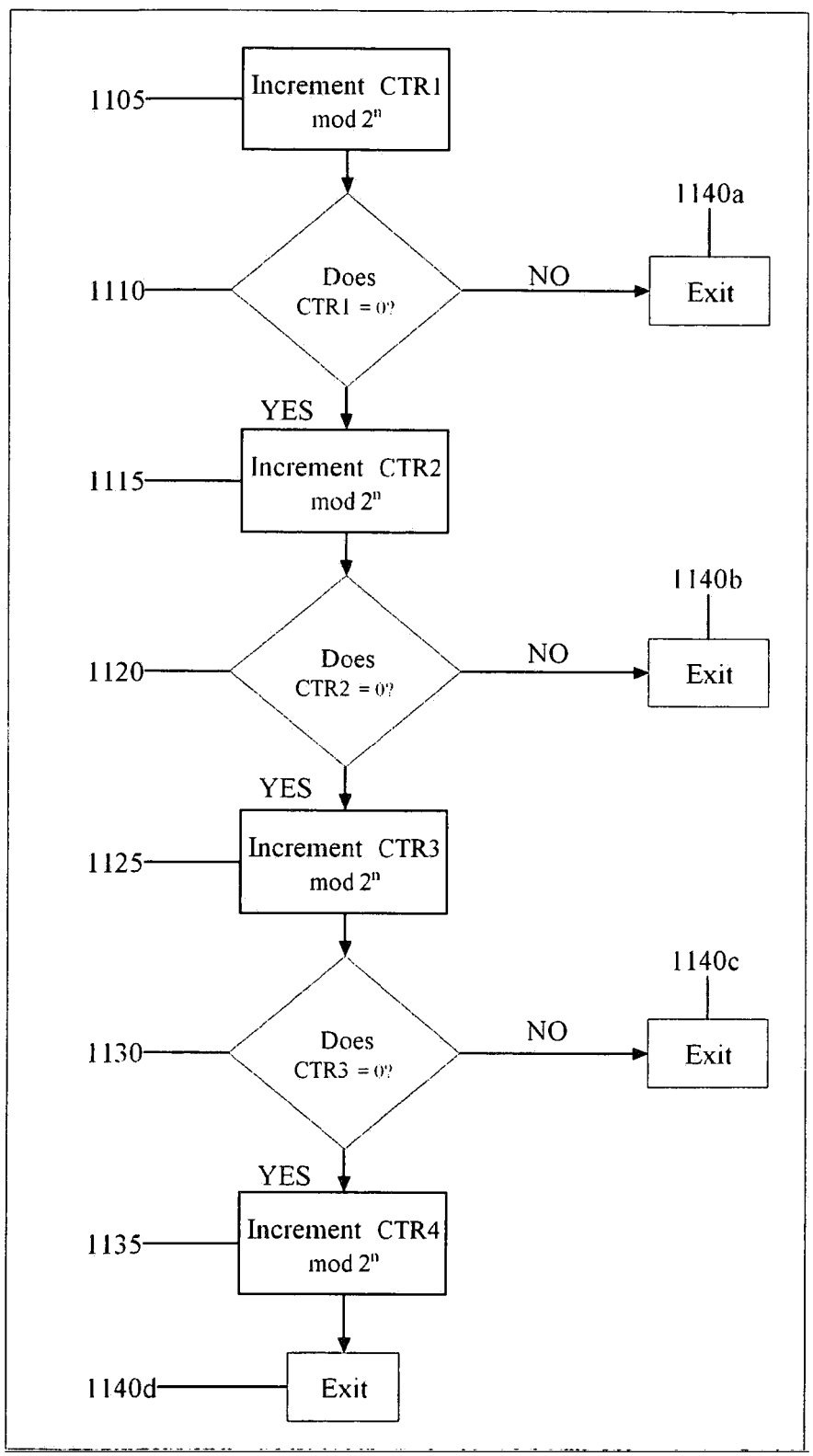
FIG. 11 illustrates an embodiment for incrementing counters.

FIG. 11 represents an embodied method for modifying the counters from one block encipherment to the next. The method takes as input four counters CTR1; through $CRT4_i$ and produces four counters $CRT1_{i+1}$ through $CRT4_{i+1}$. The steps taken in the embodied method model a typical mileage odometer from an automobile where CRT1 is the lowest order of magnitude and CTR4 is the highest order of magnitude. The embodied method always begins by incrementing the lowest order counter CTR1 1105 through modular $2^n$ addition where n is the size of the counter in bits. If CTR1 has reset itself and is equal to zero 1110, the embodied method continues to increment CTR2 1115 in the same manner as CTR1. If CTR1 is not zero 1110, the method exits 1140a and the resulting counters are stored for use in encrypting or decrypting the next block. Each subsequent counter is incremented in the same manner as long as all lower order counters are equal to zero.

Figure 12:
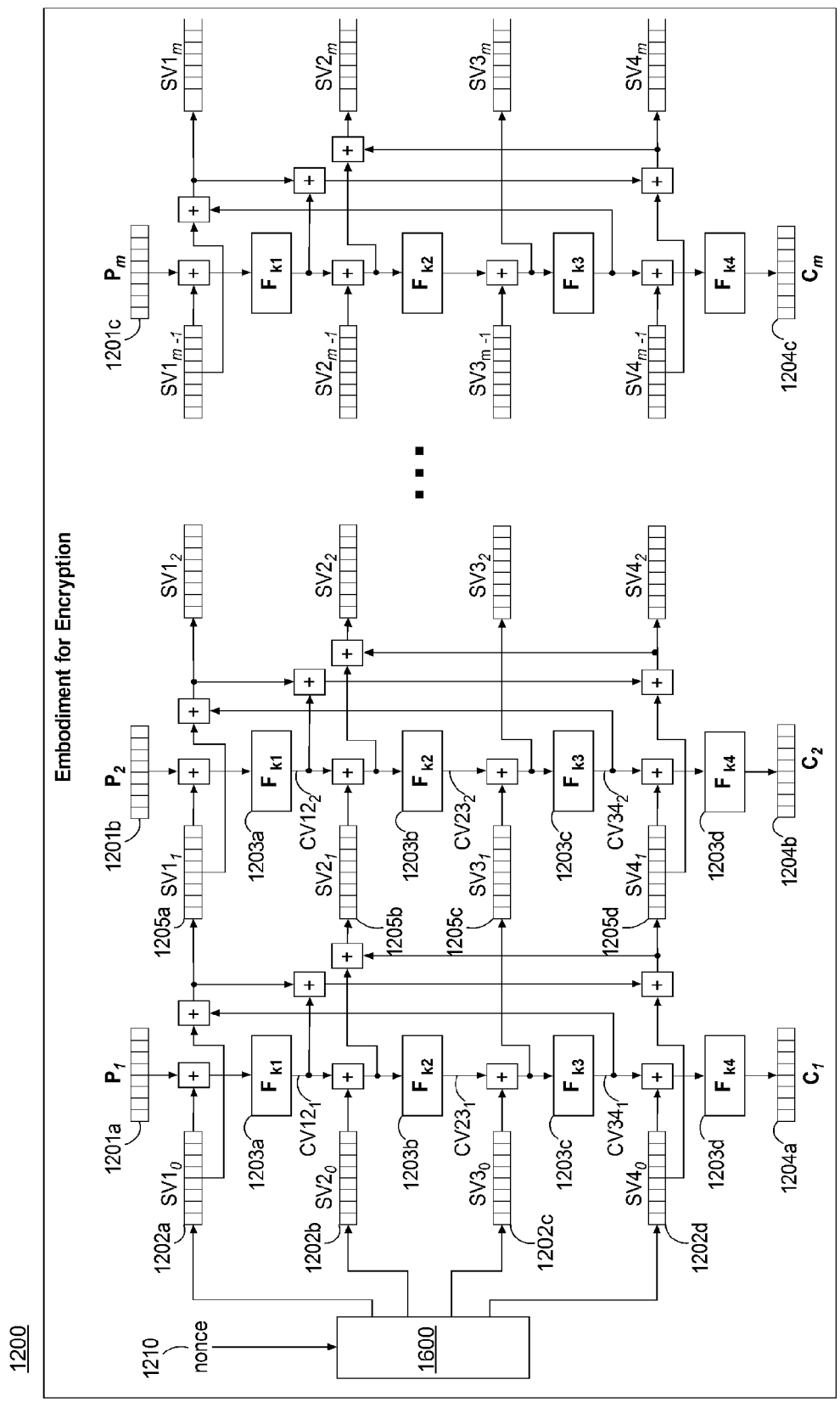
FIG. 12 illustrates an alternative embodiment of an encryption system.

FIG. 12 represents an embodiment of the encryption system using an alternative feedback mechanism to that shown in FIG. 3. The embodiment shown in FIG. 12 is similar to that shown in FIG. 3 and similar elements are similarly numbered.

However, the second state variable $SV2_1$ 1205b of FIG. 12 is generated in a different manner. In this embodiment, $SV2_1$ 1205b is generated by combining the previous state variable $SV2_0$ 1202b with the output from the previous block's first permutation $CV12_1$ and the current block's fourth state variable $SV4_1$ 1205d through modular $2^n$ addition. It should be noted that the calculation of $SV4_1$ 1205d should be available before the calculation of $SV2_1$ 1205b. Including this feedback mechanism allows the fourth state variable SV4 to influence the next state of the other state variables. This feedback may increase the strength of the cipher by providing an increase in the periodicity of the state variables.

The encryption embodiment may also include a step for initializing the state variables 1202 by passing a nonce 1210 through a randomization function 1600 that is discussed in detail below.

Figure 13:
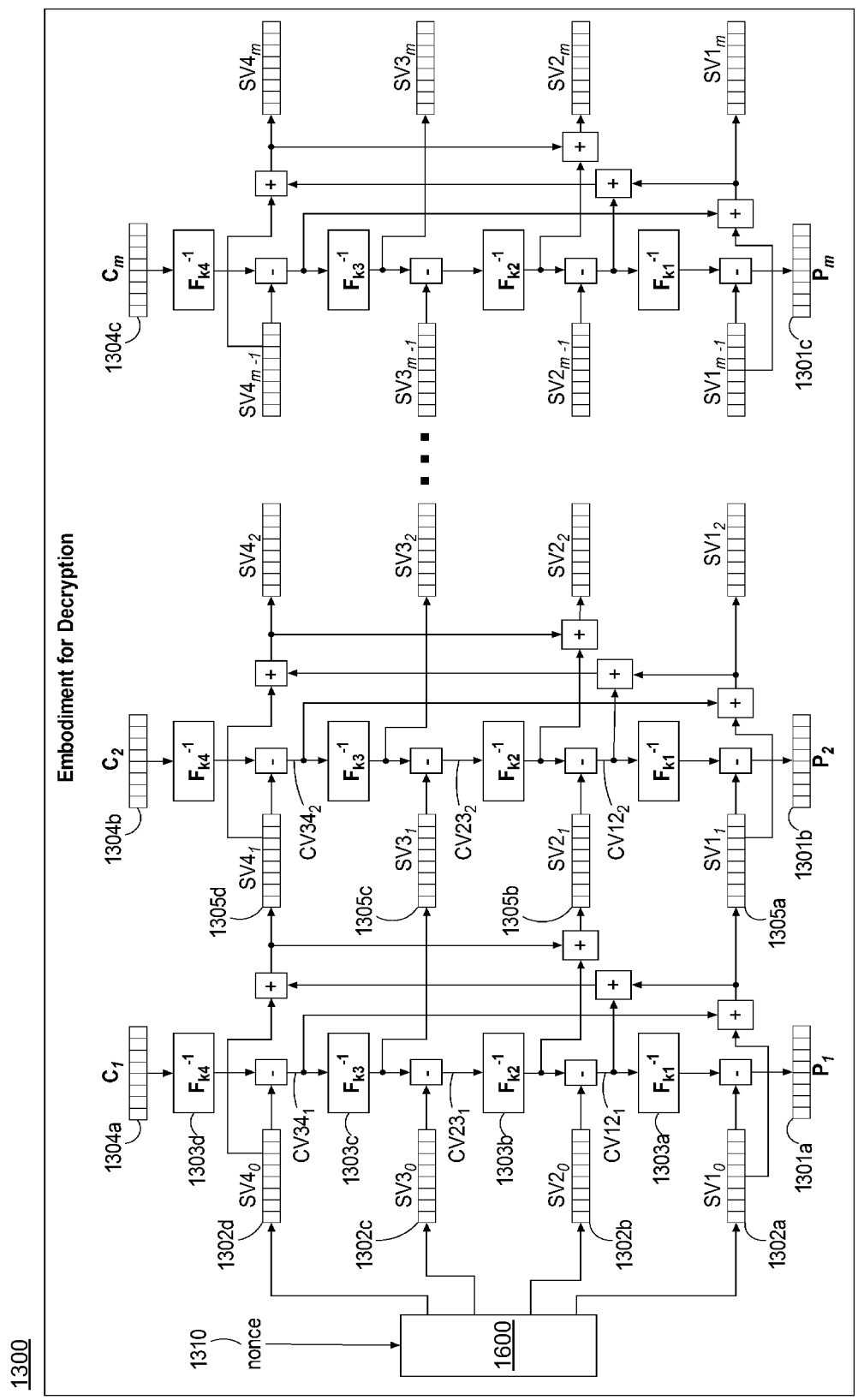
FIG. 13 illustrates an alternative embodiment of a decryption system.

FIG. 13 represents an embodiment of the decryption system using an alternative feedback mechanism to that shown in FIG. 4. The embodiment shown in FIG. 13 is similar to that shown in FIG. 4 and similar elements are similarly numbered. In order to decrypt and authenticate messages encrypted by the embodiment shown in FIG. 12, the decryption embodiment has a similar feedback mechanism for calculating the state variables. The second state variable $SV2_1$ 1305b is generated by combining the output of the previous block's third inverse permutation $F_{k1}^{-1}$ 1303b and the current block's state variable $SV4_1$ 1305d. It should be noted that the calculation of $SV4_1$ 1305d should be available before the calculation of $SV2_1$ 1305b.

Similar to the encryption embodiment, the decryption embodiment may also include a step for initializing the state variables 1302 by passing a nonce 1310 through a randomization function 1600 that is discussed in detail below.

Figure 14:
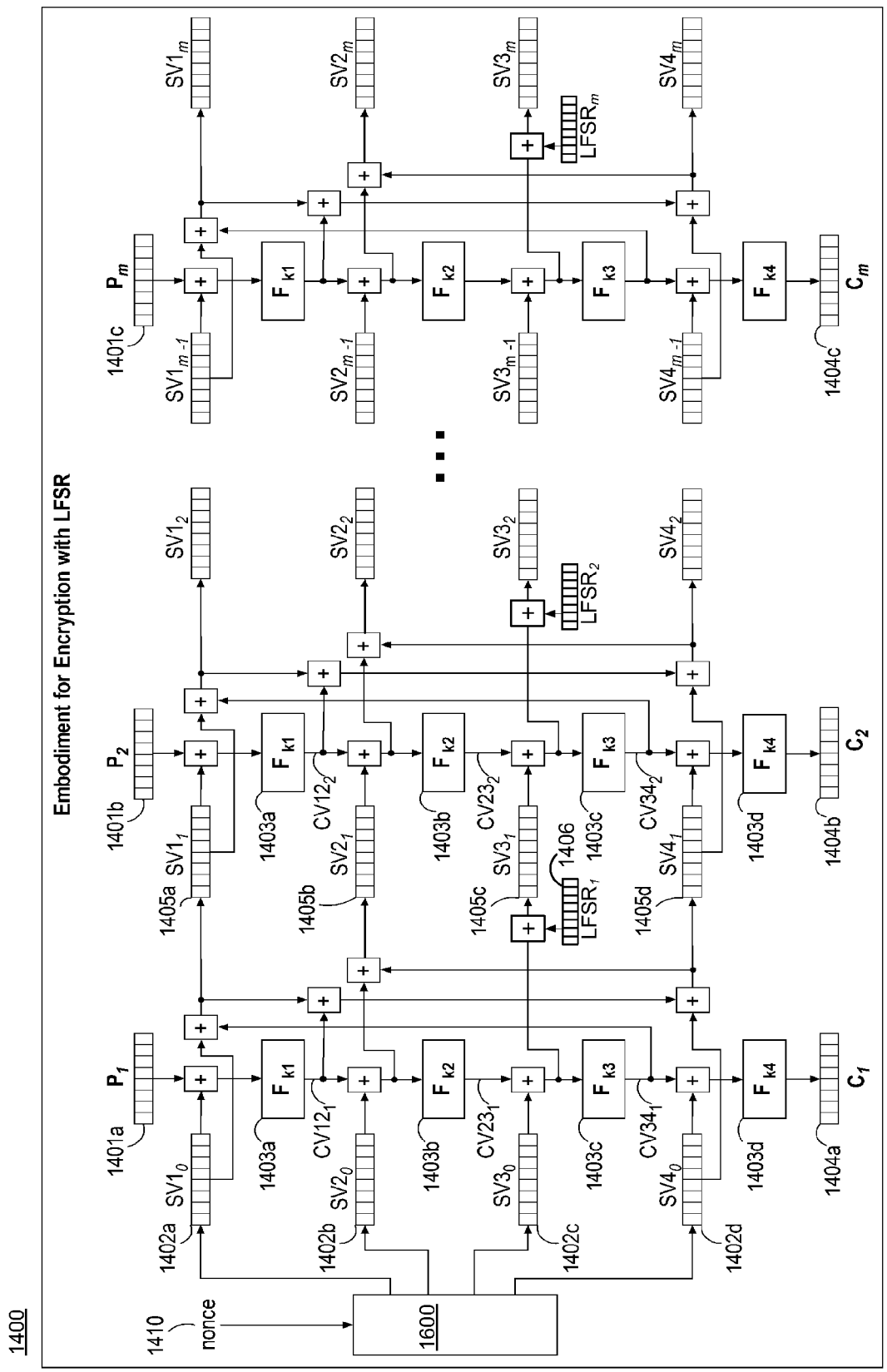
FIG. 14 illustrates an embodiment of an encryption system using an LFSR.

FIG. 14 represents an embodiment of the encryption system of FIG. 12 where an LFSR is incorporated into the cipher. The incorporation of the LFSR prevents the state of the cipher from cycling before the state of the LFSR cycles. The size of the LFSR may be arbitrary. The embodiment shown in FIG. 14 is similar to that shown in FIG. 12 and similar elements are similarly numbered. The embodiment in FIG. 14 uses the LFSR in the feedback mechanism of the third state variable $SV3_1$ 1405c. In this embodiment, $SV3_1$ 1405c is generated by combining the previous state variable $SV3_0$ 1402c with the output from the previous block's second permutation $CV23_1$ and the LFSR 1406 through modular $2^n$ addition.

If the LFSR is larger than n, the size of the plaintext blocks, then n bits may be used from the LFSR in the modular $2^n$ addition. Either the upper or lower n bits may be used for simplicity. The LFSR 1406 may then be clocked, at least once, prior to the next use in calculation of state variable $SV3_1$. The LFSR 1406 may be clocked using a Galois configuration.

The feedback configuration shown in FIG. 14 using an LFSR is similar to that shown in FIG. 9 using counters. Using an LFSR is a more efficient hardware solution than the counter approach shown in FIG. 9 because LFSR themselves are more efficient in hardware and, due to the nature of the LFSR sequence, fewer of the state variables need to use the LFSR in the feedback mechanism. Although only one LFSR feedback is shown in FIG. 14, other embodiments could use the LFSR feedback in the feedback path of multiple or different state variables.

The encryption embodiment may also include a step for initializing the state variables 1402 and LFSR 1406 by passing a nonce 1410 through a randomization function 1600 that is discussed in detail below.

Figure 15:
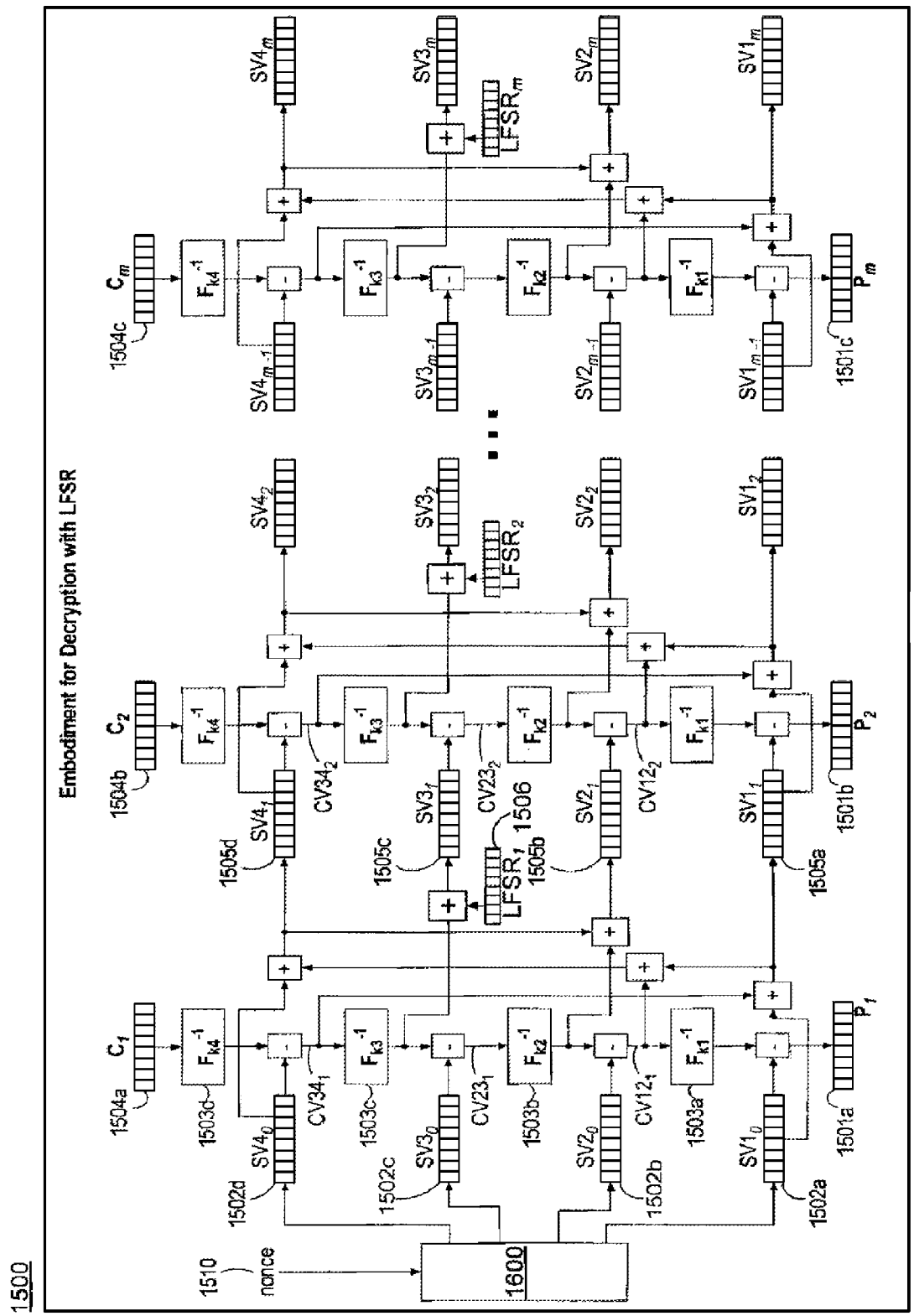
FIG. 15 illustrates an embodiment of a decryption system using an LFSR.

FIG. 15 represents an embodiment of the decryption system where an LFSR is incorporated into the cipher. The embodiment shown in FIG. 15 is similar to that shown in FIG. 13 and similar elements are similarly numbered. In order to decrypt and authenticate messages encrypted by the embodiment shown in FIG. 14, the decryption embodiment has a similar feedback mechanism for calculating the state variables using an LFSR. The third state variable $SV3_1$ 1505c is generated by combining the output of the previous block's second inverse permutation $F_{k3}^{-1}$ 1503c and n bits from the LFSR 1506 through modular $2^n$ addition. The LFSR should then be clocked in the similar manner to the encryption embodiment used.

Figure 16:
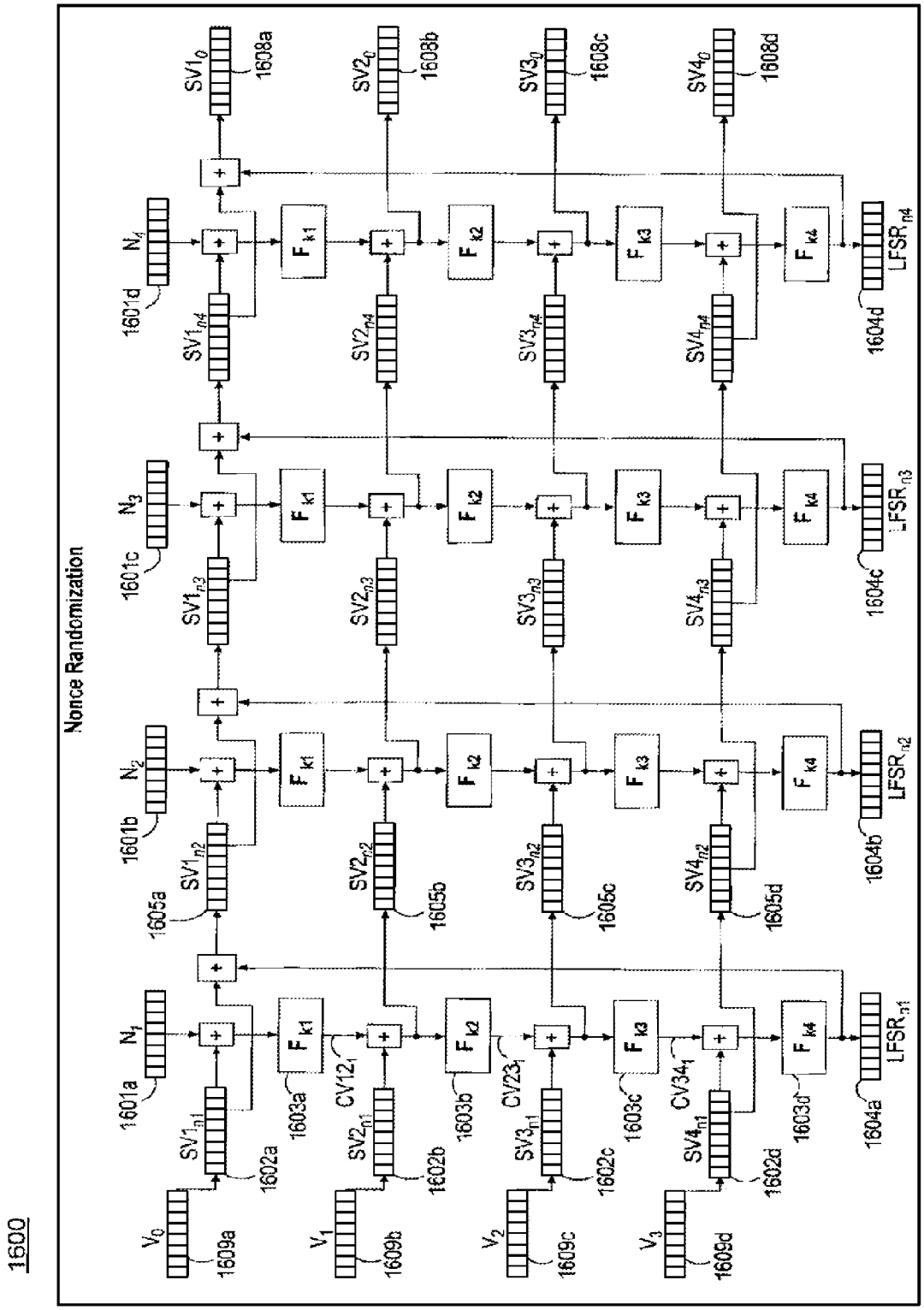
FIG. 16 illustrates an embodiment for initializing variables using a nonce.

FIG. 16 illustrates an embodiment for initializing variables using a nonce. The purpose is to initialize the state variables and LFSR to unique and unpredictable values that are used in the initial setup for both the encryption and decryption methods. The nonce or input to the function may be a random number, an incrementing counter, or any value as long as it has not been used before in the context of a given key(s). It should be noted that the nonce need not be secret. The initialization function parses the nonce into m blocks $V_i$ 1609 that is used to populate the state variable registers 1602. Padding may be necessary in order to facilitate equal sized blocks. The number of blocks m and the number of pseudorandom permutations m should always be the same. In the embodiment of the initialization function shown in FIG. 16 m is equal to 4. The randomization function keys each of the four permutations $F_k$ 1603 with different keys k1, k2, k3, and k4.

The input to the first pseudorandom permutation $N_i$ 1601 can be defined as the sum of the initial state variable $SV1_{ni}$ 1602a+$SV3_{ni}$ 1602c or any combination of the state variables. If an argument, in addition to the nonce, is passed to the said function, then this value may also be incorporated into the calculation of $N_i$ 1601 using mod $2^n$ addition.

Once the state variables 1602 are populated and the $N_1$ 1601a calculation is complete, the first block $N_1$ 1601a is combined with the initial state variable $SV1_{n1}$ 1602a through modular $2^n$ addition where n is the size of a block. The result of the combination is passed into the first pseudorandom permutation $F_{k1}$ 1603a producing an intermediate cryptographic variable $CV12_1$ (the cryptographic variable between the first pseudorandom permutation $F_{k1}$ 1603a and the second $F_{k2}$ 1603b) which will be fed forward to encrypt the next block $N_2$ 1601b. Continuing with the randomization function of $N_1$ 1601a, $CV12_1$ is combined with the second initialized state variable $SV2_{n1}$ 1602b through modular $2^n$ addition and passed into the second pseudorandom permutation $F_{k2}$ 1603b resulting in $CV23_1$. The randomization continues to follow the same pattern for the two remaining pseudorandom permutations $F_{k3}$ 1603c and $F_{k4}$ 1603d where the result of $F_{k4}$ 1603d is the first $LFSR_{n1}$ 1604a value. It should be noted that some embodiments may not use all or any of the generated LFSR 1604 values.

For the next block $N_2$ 1601b, the state variables 1605 must be updated using a feedback mechanism as will be described. In comparison with the nonce randomization embodiment shown in FIG. 5, the feedback mechanism provided in the embodiment of FIG. 16 is simpler and easier to implement. Since the results of this encryption method are never revealed, that is, it is either discarded or used to populate the LFSR, the simpler feedback mechanism may be used to more efficiently randomize the nonce without any cryptographic vulnerability. The first state variable $SV1_{n2}$ 1605a produced following the randomization of the first block $N_1$ 1601a is generated by combining the previous state variable $SV1_{n1}$ 1602a with the output from the previous block's fourth permutation $LFSR_{n1}$ 1604a through modular $2^n$ addition where n is the size of a block. The second state variable $SV2_{n2}$ 1605b is generated by combining the previous state variable $SV2_{n1}$ 1602b with the output from the previous block's first permutation $CV12_1$ through modular $2^n$ addition. Similarly, the third state variable $SV3_{n2}$ 1605c is generated by combining the previous state variable $SV3_{n1}$ 1602c with the output from the previous block's second permutation $CV23_1$ through modular $2^n$ addition. Similarly, the fourth state variable $SV4_{n2}$ 1605d is generated by combining the previous state variable $SV4_{n1}$ 1602d with the output from the previous block's third permutation $CV34_1$ through modular $2^n$ addition. $N_2$ 1601b may now be updated by combining $SV1_{n2}$ 1605a and $SV3_{n2}$ 1605c using modular $2^n$ addition. It should be noted that $SV1_{n2}$ and $SV3_{n2}$ should be available before the calculation of $N_2$ 1601b. Furthermore, while the described embodiment stores the state variables SV1, SV2, SV3, and SV4, derived embodiments could entail the same spirit of the present embodiments without actually storing the state variables. The step of storing state variables is disclosed for ease of understanding.

The randomization of all further plaintext blocks $N_2$ 1601b through $N_4$ 1601d are conducted in the same manner as the randomization of $N_1$ 1601a. For example, the second plaintext block $N_2$ 1601b is conducted in the same manner as the randomization of the first plaintext block $N_1$ 1601a substituting the updated state variables 1605 for the previous state variables 1602. After the four blocks 1601 are each randomized, the resulting state variables $SV1_0$, $SV2_0$, $SV3_0$, and $SV4_0$ 1608 may be used as initial state variables for the encryption or decryption embodiments. Similarly, the resulting randomized values, $LFSR_{n1}$, $LFSR_{n2}$, $LFSR_{n3}$, and $LFSR_{n4}$ 1604 may be used as initial LFSR for FIG. 14 or 15. An LFSR register 1604 with a state of zero can be avoided by setting one or more of the bits in the register before clocking. The LFSR 1604 may be clocked at least once before being used in FIG. 14 or 15.

Figure 17:
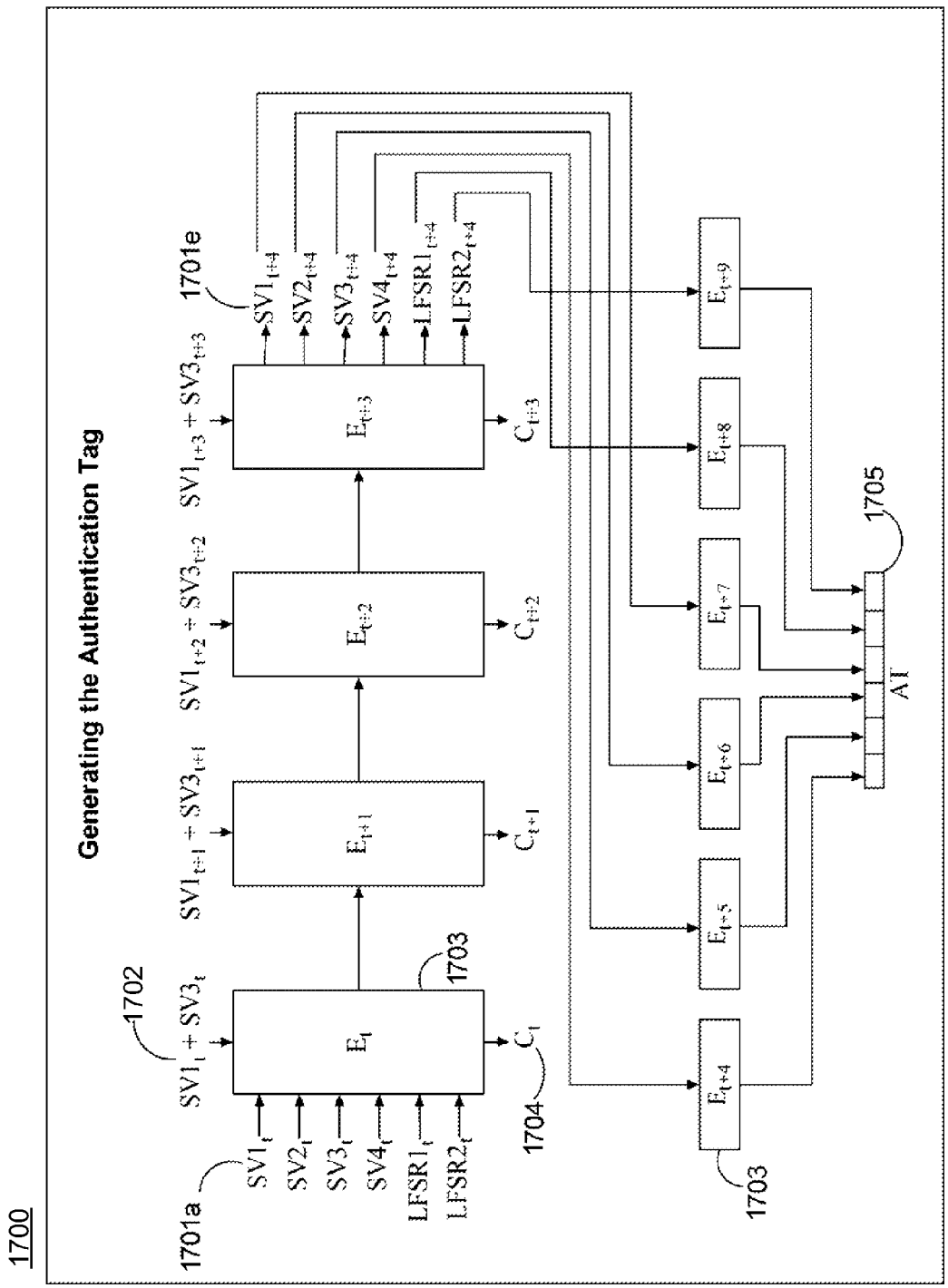
FIG. 17 illustrates an embodiment wherein an authentication tag is generated from the final state variables.

FIG. 17 illustrates an embodiment wherein the authentication tag is generated from the final state variables. The encryption methods described above are represented as encryption function $E_{t+i}$ 1703 taken at time t. In this case time t represents the condition of the state variables SV1, SV2, SV3, SV4, LFSR1, and LFSR2 1701a after encrypting the final plaintext character. It should be noted that the nonce initialization is not necessary in the said encryption function 1703 since that would have occurred before encrypting the first plaintext character.

The method for generating the authentication tag begins by advancing the state variables to a condition that bears no resemblance to the condition of the state variables at time t. This is referred to as creating distance. The distance is accomplished be summing the state variables $SV1_{t+i}$ and $SV3_{t+i}$ 1702 using modular $2^n$ addition and inputting the result into the encryption function 1703 in the place of the plain text. The encryption operation causes the state variables to change state, therefore creating distance, and creates ciphertext $C_{t+i}$ 1704 that may be discarded. This process is iterated three more times, however in other embodiments it may be advantageous to iterate fewer or more times.

After creating distance, a snapshot of the state variables 1701e taken at time t+i, where i represents the number of encryption iterations which in this embodiment is 4. Each of the state variables in the snapshot $SV1_{t+4}$, $SV2_{t+4}$, $SV3_{t+4}$, $SV4_{t+4}$, $LFSR1_{t+4}$, $LFSR2_{t+4}$, 1701e is input into the encryption function 1703 resulting in an authentication tag AT 1705 that represents all of the state variables. As explained previously, an authentication tag is used to provide an integrity check on encrypted data. Alternate embodiments may generate the authentication tag 1705 by using any permutation or combination of the encrypted state variables. Alternative embodiments may also choose to encrypt the final state variables in a different order than that shown in FIG. 17.

Figure 18:
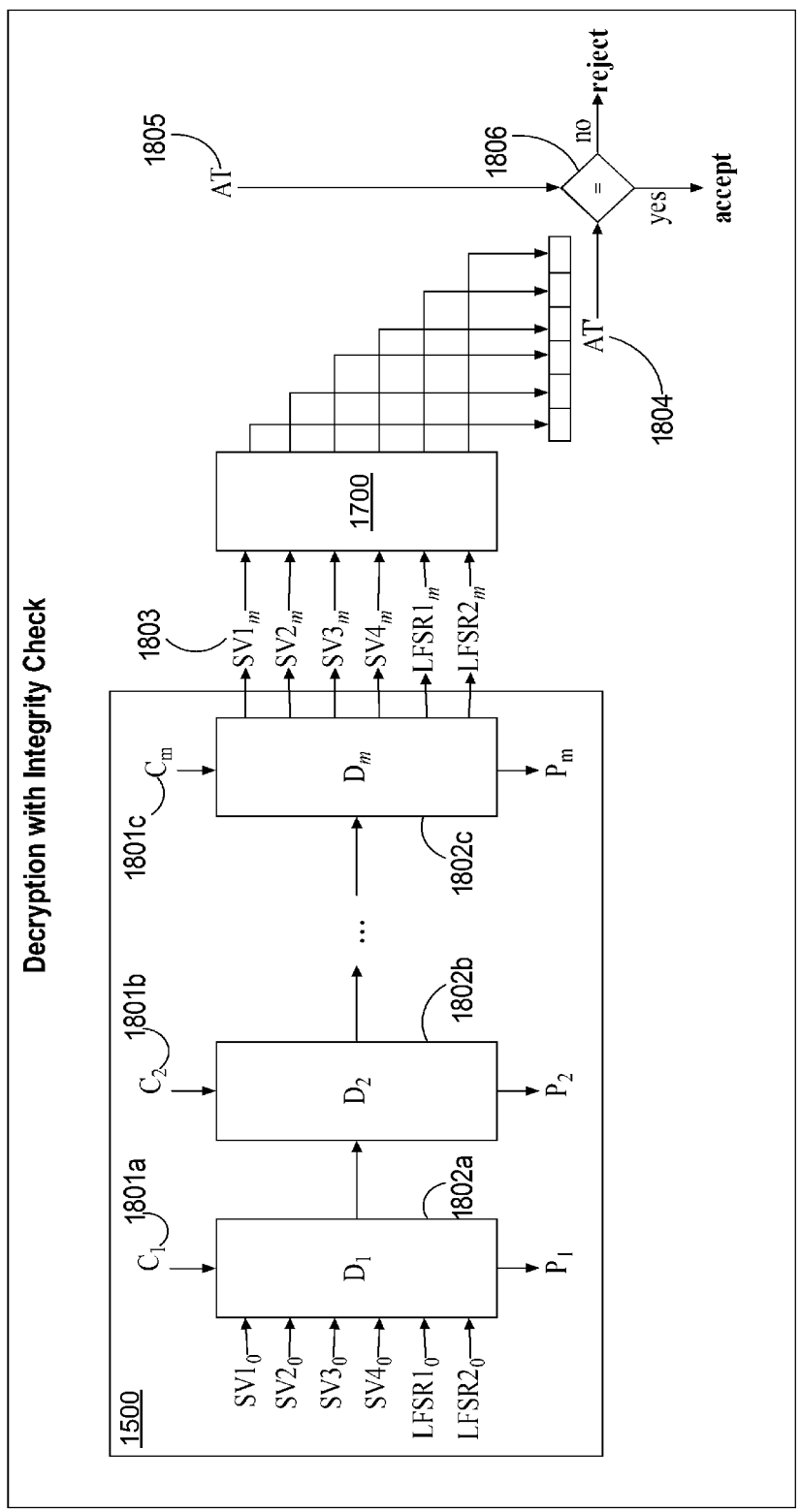
FIG. 18 illustrates an embodiment of a method for decrypting and verifying the integrity of a message using a received authentication tag.

FIG. 18 illustrates an embodiment of a method for decrypting and verifying the integrity of a message using a received authentication tag. The decryption methods described above are represented by decryption function $D_i$ 1802. The embodiment shown in FIG. 18 is using the decryption process 1500 described with respect to the embodiment shown in FIG. 15.

The received message to be decrypted includes the ciphertext $C_i$ 1801 along with an authentication tag AT 1805. The embodiment shown in FIG. 18 is configured to use the same process for generating an authentication as the embodiment shown in FIG. 17. As each decryption function $D_i$ 1802 decrypts the corresponding ciphertext $C_i$ 1801 the state variables are passed to each subsequent decryption function. The final state variables 1803 output from the decryption function may then be used to generate an authentication tag. The process of generating the authentication tag AT' 1804 is represented as process 1700 as described in the embodiment of FIG. 17.

The received authentication tag AT 1805 identifies the original message that was encrypted, while the newly generated authentication tag AT' 1804 identifies the received message. With the two authentication tags, an integrity check 1806 is performed. The integrity check determines whether the two authentication tags are equal, if they are not equal the message may have been modified between its encryption and decryption and the message should be rejected. Conversely, if the authentication tags are equal, it can be assured with high probability that the message has not been tampered with and can be accepted.

Figure 19:
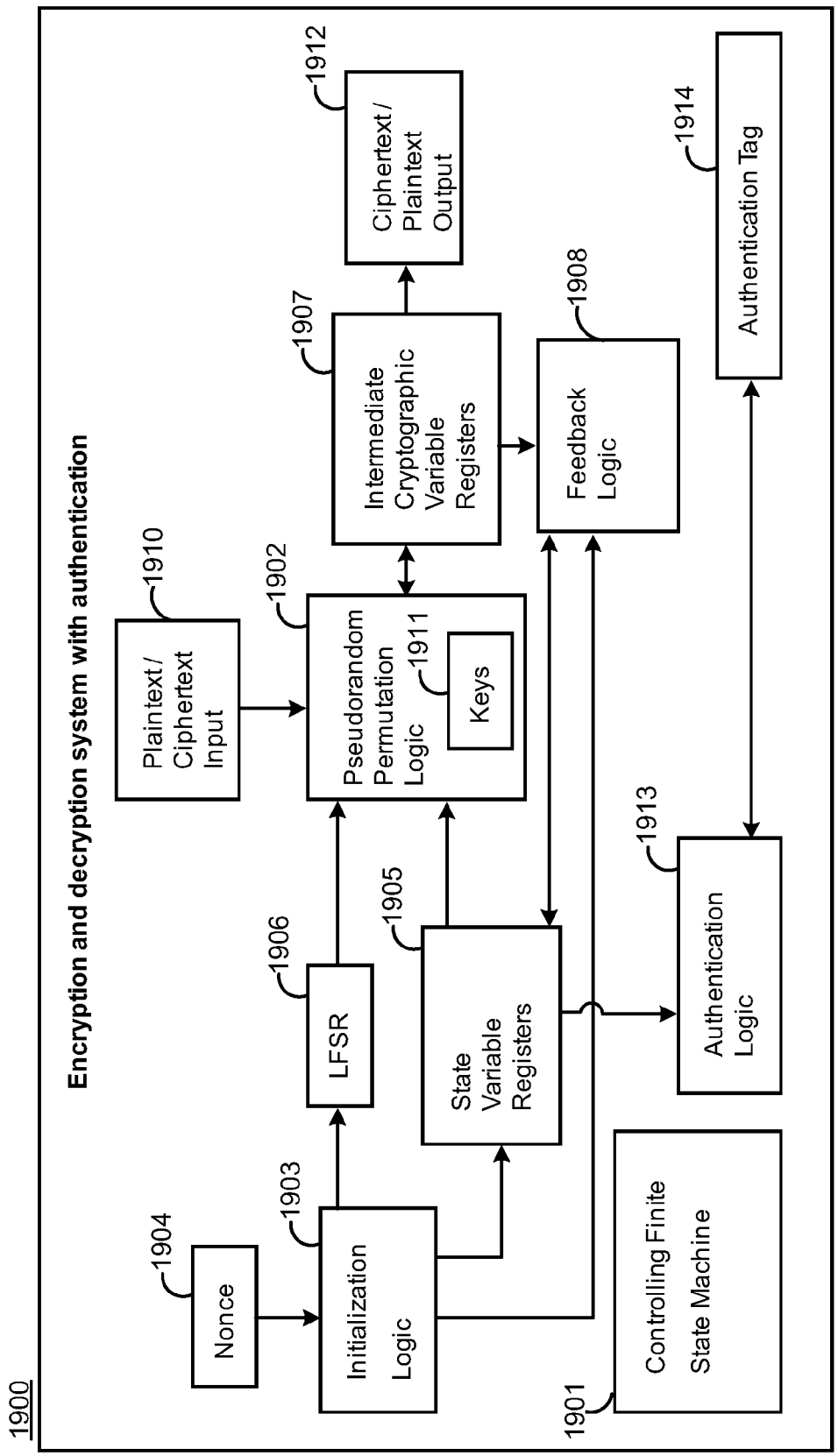
FIG. 19 illustrates a hardware embodiment of a system for encryption/decryption and authentication.

FIG. 19 illustrates a hardware embodiment of a combined encryption and decryption engine for performing encryption/decryption and authentication as described above. The system 1900 is capable of performing both encryption and decryption along with generating and verifying the authentication tag. While the system 1900 is shown as a number of discrete blocks or modules, each may be implemented together with other blocks in either software or hardware. Each of these blocks may provide control logic, memory elements, and data path functions, either in whole or in part.

The register or storage blocks are memory elements that may be used to store state variable inputs and outputs. In a hardware implementation, such as an ASIC or FPGA, these blocks may be hardware registers composed of flip-flops or other memory known memory elements such as various RAM implementations or register files. In a software implementation the memory elements may be any memory accessible by a processor for storing program data.

The control logic is shown as a controlling finite state machine 1901 that is responsible for controlling the various blocks of the system 1900 depending on the desired function. The control logic 1901 may be implemented as a state machine in ASIC or FPGA, or in a software implementation, a microprocessor running specific software to implement the encryption/decryption functions. The connections between the control logic 1901 and the other modules are omitted from FIG. 19 for simplicity. The control logic 1901 determines the function of the system 1900, for example, whether the function is encrypting, decrypting, initializing or authenticating received data. Depending on the function, the control logic 1901 controls the state of the various logic blocks including whether the block is active or what function it is performing. For example, the finite state machine may indicate to the encryption/decryption logic that it should be in the encryption state and selecting the appropriate key.

Although the diagram shows a centralized finite state machine 1901, the control logic may also be distributed among various blocks within the system. As shown in FIG. 19, the initialization logic 1903 may also be considered control logic and is responsible for controlling the initialization of the system 1900, however, part of this functionality could also be contained within the finite state machine 1901. In a microprocessor-based implementation, all of this additional control logic distributed in FIG. 19 may be embodied in the specific software running on the microprocessor in order to operate the encryption/decryption system.

The function of the initialization logic 1903 is to generate initial values for the state variables 1905 and, if used, an LFSR or counter 1906. The initialization logic 1903 uses a nonce 1904 that may be a random number, an incrementing counter, or any other value as long as it has not been used before with a given key. The nonce block 1904 may also contain the appropriate hardware to select another unique value sometime after the current nonce has been used.

The initialization logic 1903 populates the state variable registers with the nonce 1904 by parsing the nonce similarly to the process described with respect to FIG. 16. The initialization logic 1903 may then calculate part of the input to the pseudorandom permutation logic 1902 similar to the calculations used to generate each of the $N_i$ as described with respect to FIG. 16.

Next, the initialization logic 1903 indicates to the pseudorandom permutation logic 1902 to select the inputs to the permutation function, this includes the key and the input data. According to the nonce randomization described with respect to FIG. 16, in the first stage the input data to the permutation function is the $N_i$ variable combined with the initial state variable $SV_{n1}$ through modular $2^n$ addition. The output from the pseudorandom permutation function is stored in the appropriate intermediate cryptographic variable register 1907 as selected by either the initialization logic 1903 or the control logic 1901. The initialization logic then repeats this process for each of the state variables, selecting the appropriate key and input data for the permutation function. The output from the final permutation function may be used to seed the LFSR 1906. The feedback logic 1908, under the control of either the finite state machine 1901 or the initialization logic 1903, selects the appropriate combination of the intermediate cryptographic variables and current state variables to generate the next value of the state variable registers 1905. The above process may then be repeated to either fill the LFSR 1906 or to create the desired distance from the nonce 1904.

After initialization, the system 1900 is ready to encrypt plaintext blocks. The controller 1901 selects plaintext input 1910 in appropriately sized blocks as input to the pseudorandom permutation function 1902 and selects one of the keys 1911. The controller 1901 also selects the appropriate state variable as input to the pseudorandom permutation logic 1902 from the state variable registers block 1905. The output from the pseudorandom permutation logic 1902 is then stored in one of the intermediate cryptographic variable registers 1907 as selected by the controller 1901. This process may then be repeated using the state variables and the previously generated cryptographic variables as input to the pseudorandom permutation logic 1902. The output from the final iteration of the pseudorandom permutation logic 1902 is the first ciphertext block that corresponds to the plaintext input. Under direction from the controller 1901, the ciphertext block will be transmitted to ciphertext output block 1912.

After a plaintext block has been encrypted, the system 1900 must update the state variable registers 1905. The control logic 1901 passes the intermediate cryptographic variables 1907 and the state variable registers 1905 to the feedback logic block 1908. The output from feedback logic block 1908 is then use to update the state variable registers 1905. The feedback logic may be configured to implement the modulo $2^n$ addition feedback mechanism discussed above. The LFSR 1906 may also be included as an input to the feedback mechanism, and the controller 1901 should clock the LFSR sometime after the current LFSR value has been used. Once the state variable registers 1905 have been updated, the system 1900 is ready to begin encrypting the next plaintext from plaintext input block 1910.

The system 1900 may also generate an authentication tag 1914 based on the previously encrypted plaintext so that a recipient of the ciphertext may be provided some assurance that the ciphertext has not been altered. This authentication logic 1913 may control the authentication tag generation process, or in alternative embodiments, this authentication tag generation process may be encompassed in the control logic 1901. The authentication logic 1913 may employ the methods shown in FIG. 6, FIG. 7, or FIG. 17. Implementing the approaches shown in FIGS. 6 and 7 involve the authentication logic 1913 concatenating the state variables into the authentication tag 1914, with or without masking. Implementing the approach shown in FIG. 17 requires either the authentication logic 1913 or the controller 1901 to further encrypt the state variables to create distance from the post-encryption value of the state variables. The authentication logic 1913 or the control logic 1901 may further encrypt these state variables prior to concatenation in the authentication tag 1914.

The authentication logic 1913 is also responsible for verifying the integrity of decrypted messages. The decryption function of the system 1900 is carried out in a similar manner to encryption as discussed above. The control logic 1901 selects the state variables 1905, the LFSR 1906 and the ciphertext input 1910 to the pseudorandom permutation logic 1902. After decrypting all of the received ciphertext blocks, the authentication logic 1913 will generate an authentication tag 1914 as described above and compare the generated authentication tag 1914 to the authentication tag received with the ciphertext.

When decrypting, if the system 1900 is not synchronized with the encrypting transmitter, the initialization logic 1903 may also be used to initialize the state variable registers 1905 and the LFSR 1906 prior to decryption operations.

In one embodiment, a method for encrypting a plaintext message comprises receiving at least one plaintext message, wherein the plaintext message forms at least one plaintext block, encrypting said plaintext block by applying 2 or more pseudorandom permutations to each block, and modifying an input to each said pseudorandom permutation by at least one state variable which is modified for each plaintext block by at least one of previously generated permutation outputs, previously generated permutation inputs, ciphertext, and plaintext. The method comprises generating at least one ciphertext block from the output of each plaintext block's final pseudorandom permutation, partitioning the plaintext message into a plurality of equal size plaintext blocks, padding the plaintext message to facilitate the equal sized plaintext blocks, wherein the modification of the state variables comprises at least one of: modifying the state variable for a first pseudorandom permutation by an output of a next to the last pseudorandom permutation from the previous block, modifying the state variable for a final permutation by an output of the first pseudorandom permutation from the previous block and the state variable for the first pseudorandom permutation from the current block, and modifying the state variables for all other pseudorandom permutations by an output of the preceding pseudorandom permutation from the previous block, wherein the state variables are modified using at least one of modular $2^n$ addition and ☐modular $2^n$ subtraction wherein n represents the size of a block, and wherein the state variables are modified using a bitwise exclusive or (XOR).

The method comprises initializing the state variables before encrypting the first plaintext block by randomizing a nonce and padding the nonce in order to facilitate the initialization of the state variables, wherein the initialized state variables are unique from other initialized state variables in a context of a session key, wherein the number of pseudorandom permutations determines the number of state variables, wherein the pseudorandom permutations are at least one of: block ciphers, keyed substitution tables, S-Boxes, and rotors; wherein each pseudorandom permutation is keyed by at least one different key, wherein each pseudorandom permutation is keyed by a same key, wherein a portion of the pseudorandom permutations may be substituted for the inverses of a remaining portion of the pseudorandom permutations, and wherein the pseudorandom permutations and inverse pseudorandom permutations may be arranged in any order.

The method comprises generating an authentication tag from a combination of the state variables, wherein the generation consists of concatenating the resulting state variables after the encryption of the final plaintext block, wherein the generation consists of concatenating the resulting state variables after the encryption of a chosen plaintext block, wherein the generation consists of concatenating the resulting state variables after the encryption of the final plaintext block, concatenating the initial state variables, and combining the two sets of concatenated, variables through an exclusive or (XOR), comprises attaching the authentication tag to a ciphertext message, wherein the number of state variables determines the size of the authentication tag, and comprises modifying the input to a pseudorandom permutation by at least one counter, and initializing the counters before encrypting the first plaintext block by randomizing a □nonce.

In another embodiment, an apparatus for encrypting a plaintext message comprises logic to form at least one nonce block from at least one nonce, memory to store at least one state variable, an initializer to set the at least one state variable to at least one initial value, wherein the logic is coupled to the memory and to the initializer, wherein the logic includes at least two pseudorandom permutations to sequentially randomize each nonce block, wherein the logic combines the at least one state variable with inputs to the pseudorandom permutations, and wherein the logic generates the at least one state variable of a current nonce block from at least one of: state variables of a previous nonce block, outputs from the previous nonce block's pseudorandom permutations, and inputs to the previous nonce block's pseudorandom permutations, wherein the memory stores outputs of final pseudorandom permutations as initial values to use in an encryption or decryption, wherein the memory stores final state variables as initial values for use in an encryption or decryption, wherein the logic adds at least one bit of padding to the nonce to generate equal sized nonce blocks, wherein the number of pseudorandom permutations is equal to the number of nonce blocks and the number of state variables, wherein the pseudorandom permutations are at least one of: block ciphers, keyed substitution tables, S-Boxes, and rotors, wherein a portion of the pseudorandom permutations may be substituted for inverses of a remaining portion of the pseudorandom permutations.

In a further embodiment, a computer readable medium comprising instructions for: receiving at least one plaintext message, wherein the plaintext message forms at least one plaintext block, encrypting said plaintext block by applying 2 or more pseudorandom permutations to each block, modifying an input to the pseudorandom permutations by at least one state variable, modifying the at least one state variable after each plaintext block is encrypted for use in encrypting a next plaintext block, modifying the at least one state variable for a first pseudorandom permutation by an output of a next to last pseudorandom permutation from a previous block, modifying the at least one state variable for a final permutation by an output of the first pseudorandom permutation from the previous block and the at least one state variable for the first pseudorandom permutation from the current block, and modifying the at least one state variable for all other pseudorandom permutations by an output of a preceding pseudorandom permutation from the previous block.

The computer readable medium comprises instructions for initializing the at least one state variable before encrypting a first plaintext block by randomizing a nonce, modifying the input to a pseudorandom permutation by an internal counter, generating an authentication tag from a combination of the state variables, generating at least one ciphertext block from an output of each plaintext block's final pseudorandom □permutation, wherein the pseudorandom permutations are at least one of: block ciphers, keyed substitution tables, S-Boxes, and rotors.

Although an exemplary embodiment of the system has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the elements. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized in order to provide additional known features, and/or provide greater efficiency. Also, the information sent between various modules can be sent between the modules via at least one of a wireless source, and a wired source and via plurality of protocols.

The invention claimed is:

1. An encryption engine for encrypting a plaintext message, comprising:
   a memory for storing at least one state variable; and
   control logic configured to:
      form at least one nonce block from at least one nonce;
      initialize the at least one state variable to at least one initial value;
      randomize each nonce block by applying two or more pseudorandom permutations to each nonce block;
      modify a first input to each of said pseudorandom permutations by the at least one state variable which is modified for each nonce block by state variables of a previous nonce block, outputs from the previous nonce block's pseudorandom permutations, and inputs to the previous nonce block's pseudorandom permutations;
      receive at least one plaintext message, wherein the plaintext message forms at least one plaintext block;
      encrypt said plaintext block by applying two or more pseudorandom permutations to each block; and
      modify a second input to each of said pseudorandom permutations by the at least one state variable which is modified for each plaintext block by at least one of previously generated permutation outputs, previously generated permutation inputs, ciphertext, and plaintext.

2. The encryption engine of claim 1 wherein the modification of the state variables comprises at least one of:
   modifying the state variable for a first pseudorandom permutation by an output of a next to the last pseudorandom permutation from the previous block;
   modifying the state variable for a last permutation by an output of the first pseudorandom permutation from the previous block and the state variable for the first pseudorandom permutation from the current block;
   modifying the state variable for a second pseudorandom permutation by an output of the preceding pseudorandom permutation from the previous block and the state variable for the last pseudorandom permutation from the current block; and
   modifying the state variables for all other pseudorandom permutations by an output of the preceding pseudorandom permutation from the previous block.

3. The encryption engine of claim 2, wherein the state variables are modified using at least one of modular $2^n$ addition and modular $2^n$ subtraction wherein n represents the size of a block.

4. The encryption engine of claim 2, wherein the state variables are modified using a bitwise exclusive or (XOR).

5. The encryption engine of claim 2, wherein the control logic is further configured to:
   initialize the state variables before encrypting the first plaintext block by randomizing a nonce.

6. The encryption engine of claim 5, wherein the control logic is further configured to pad the nonce in order to facilitate the initialization of the state variables.

7. The encryption engine of claim 5, wherein the initialized state variables are unique from other initialized state variables for a given key.

8. The encryption engine of claim 2, wherein the number of pseudorandom permutations determines the number of state variables.

9. The encryption engine of claim 2, wherein each pseudorandom permutation is keyed by at least one different key.

10. The encryption engine of claim 2, wherein a portion of the pseudorandom permutations may be substituted for the inverses of a remaining portion of the pseudorandom permutations.

11. The encryption engine of claim 10, wherein the pseudorandom permutations and inverse pseudorandom permutations may be arranged in any order.

12. The encryption engine of claim 1, wherein the control logic is further configured to:
modify an input to each of said pseudorandom permutations by the at least one state variable which is modified for each plaintext block by at least one of previously generated permutation outputs, an LFSR, previously generated permutation inputs, ciphertext, and plaintext; and
modify at least one state variable by the LFSR.

13. The encryption engine of claim 12, wherein the control logic is further configured to:
generate an authentication tag from a combination of the state variables and the LFSR after the encryption of a final plaintext block.

14. The encryption engine of claim 12, wherein the control logic is further configured to initialize the LFSR before encrypting the first plaintext block by randomizing a nonce.

15. The encryption engine of claim 13, wherein the control logic is further configured to attach the authentication tag to a ciphertext message.

16. The encryption engine of claim 13, wherein the control logic is further configured to: encrypt a combination from the state variables in order to modify the state variables prior to the generation of the authentication tag.

17. The encryption engine of claim 16, wherein the control logic is configured to encrypt the combination of the state variables and the LFSR after the encryption by applying at least one pseudorandom permutation to each variable.

18. The encryption engine of claim 17, wherein the control logic is configured to generate the authentication tag by concatenating the resulting state variables after the encryption of the final plaintext block, concatenating the initial state variables, and combining the two sets of concatenated variables through an exclusive or (XOR).

19. The encryption engine of claim 1, wherein the control logic is further configured to:
modify a first state variable of a current nonce block by an output of a last pseudorandom permutation from the previous nonce block and a first state variable of a previous nonce block; and
modify the state variables for all other pseudorandom permutations of the current nonce block by the outputs from the previous nonce block's pseudorandom permutations and inputs to the previous nonce block's pseudorandom permutations.

20. The encryption engine of claim 19, wherein the memory is configured to store outputs of final pseudorandom permutations as initial values to use in any one of encryption and decryption.

21. The encryption engine of claim 19, wherein the memory is configured to store outputs of final pseudorandom permutations as initial values to seed an LFSR.

22. The encryption engine of claim 19, wherein the memory is configured to store final state variables as initial values for use in an encryption or decryption.

* * * * *